Nov. 9, 1965   J. P. KIERONSKI   3,217,235
WINDING MACHINE
Filed Oct. 12, 1962   14 Sheets-Sheet 1

INVENTOR.
JOHN P. KIERONSKI
BY
*Albert P. Davis*
ATTORNEY

INVENTOR.
JOHN P. KIERONSKI
BY
Albert P. Davis
ATTORNEY

Nov. 9, 1965    J. P. KIERONSKI    3,217,235
WINDING MACHINE
Filed Oct. 12, 1962    14 Sheets-Sheet 3

INVENTOR.
JOHN P. KIERONSKI
BY
*Albert P. Davis*
ATTORNEY

*INVENTOR.*
JOHN P. KIERONSKI
BY
*Albert P. Davis*
ATTORNEY

Nov. 9, 1965  J. P. KIERONSKI  3,217,235
WINDING MACHINE

Filed Oct. 12, 1962  14 Sheets-Sheet 5

INVENTOR.
JOHN P. KIERONSKI
BY
ATTORNEY

INVENTOR.
JOHN P. KIERONSKI
BY
ATTORNEY

Nov. 9, 1965 J. P. KIERONSKI 3,217,235
WINDING MACHINE
Filed Oct. 12, 1962 14 Sheets-Sheet 8

INVENTOR.
JOHN P. KIERONSKI
BY
Albert P. Davis
ATTORNEY

Nov. 9, 1965 J. P. KIERONSKI 3,217,235
WINDING MACHINE
Filed Oct. 12, 1962 14 Sheets-Sheet 10

INVENTOR.
JOHN P. KIERONSKI
BY
ATTORNEY

Nov. 9, 1965    J. P. KIERONSKI    3,217,235
WINDING MACHINE
Filed Oct. 12, 1962    14 Sheets-Sheet 11

INVENTOR.
JOHN P. KIERONSKI
BY
Albert P. Davis
ATTORNEY

INVENTOR.
JOHN P. KIERONSKI
BY
ATTORNEY

United States Patent Office 3,217,235
Patented Nov. 9, 1965

3,217,235
WINDING MACHINE
John P. Kieronski, Johnston, R.I., assignor to Leesona Corporation, Warwick, R.I., a corporation of Massachusetts
Filed Oct. 12, 1962, Ser. No. 230,051
3 Claims. (Cl. 221—227)

The present invention relates to winding machines of the automatic type wherein yarn is wound from supply bobbins into packages and relates, more particularly, to a fully automatic apparatus for replacing an exhausted supply bobbin with a fresh supply bobbin and introducing a free end of the fresh supply bobbin for winding into a package on said winding machine.

In U.S. Patent 2,764,362 to William V. Goodhue et al. entitled "Winding Machine" and issued September 25, 1956, there is disclosed and claimed a fully automatic winding machine for winding yarn or the like into various forms of packages. In essence, the machine of this patent consists of a winding section, including a winding mandrel mounted for controlled movement between a winding position, a braking position and a reverse-rotation position, and a driving drum provided with a groove to traverse the yarn being wound upon the mandrel; an end-finding and knot-tying section operable in the event of thread breakage and including a knot-tying device and separate means for finding the respective free ends of the broken yarn and conveying them to the knot-tier to be joined together; a preliminary yarn servicing section including means for detecting, tensioning and cleaning the yarn supplied to the mandrel; and an enclosed control section for regulating the various other sections and controlling the function thereof. It was contemplated in the machine of this patent that a reserve package of yarn would be available for introduction thereto upon exhaustion of the original supply package and means was provided on the yarn servicing section for holding the end of the yarn from the reserve package in a position of readiness and for changing to that end upon an indication, afforded by other means on the servicing section, that the original supply had run out. However, no provision was made there for transferring the reserve package from reserve to active unwinding position, or conversely, for transferring the exhausted package from active position to a discharge station where it could be removed. Instead, the yarn packages were mounted in a fixed position and, since either package had to be capable of serving as the active supply, the positions thereof necessarily represented a compromise between the most satisfactory position for the active package, i.e., with its axis in close alignment with the path of the yarn to the winding mandrel, and the most satisfactory position for the reserve package, spaced from the active package to avoid interference therewith but, nevertheless, accessible for servicing. Further, no means was provided for automatically locating the yarn end of the reserve package in position to be retrieved for joinder to the free end of the package being wound on the mandrel.

It is therefore one object of the present invention to provide a winding apparatus having a self-activating yarn supply mechanism, which mechanism is adapted to discharge the exhausted supply package, index a fresh supply from a reserve position to an active unwinding position and, thereupon, automatically present a free end of the reserve supply package for joinder into the winding operation.

Another object of the present invention is to provide a winding machine having a self-activating yarn supply indexing mechanism capable of establishing a free yarn end of the reserve supply package for ready introduction into the winding operation.

A further object of the present invention is to provide a winding machine having a self-activating yarn supply indexing mechanism wherein the sequential steps of detection of exhaustion of the yarn supply of a first package, ejection of said first package, loading of a fresh supply package from a reserve location, establishment of a free end from said fresh supply package, and introduction of said free end into the winding operation are carried out completely automatically and as one continuous operation.

Yet another object of the present invention is to provide a self-activating yarn supply indexing mechanism employing pneumatic means for removal from the outer yarn end of the reserve supply package and introducing it for uniting with take-up package outer yarn end.

Still a further object of the present invention is to provide a winding machine having a self-activating yarn supply indexing mechanism which has means for retaining a plurality of yarn supply packages in reserve and means for presenting each of said reserve supply packages individually into unwinding position.

These and further objects of the invention will in part be obvious and will in part appear hereinafter.

For a fuller understanding of the nature and objects of the invention reference should be had to the following detailed description taken in connection with the accompanying drawing wherein.

GENERAL DESCRIPTION

Figure 1:
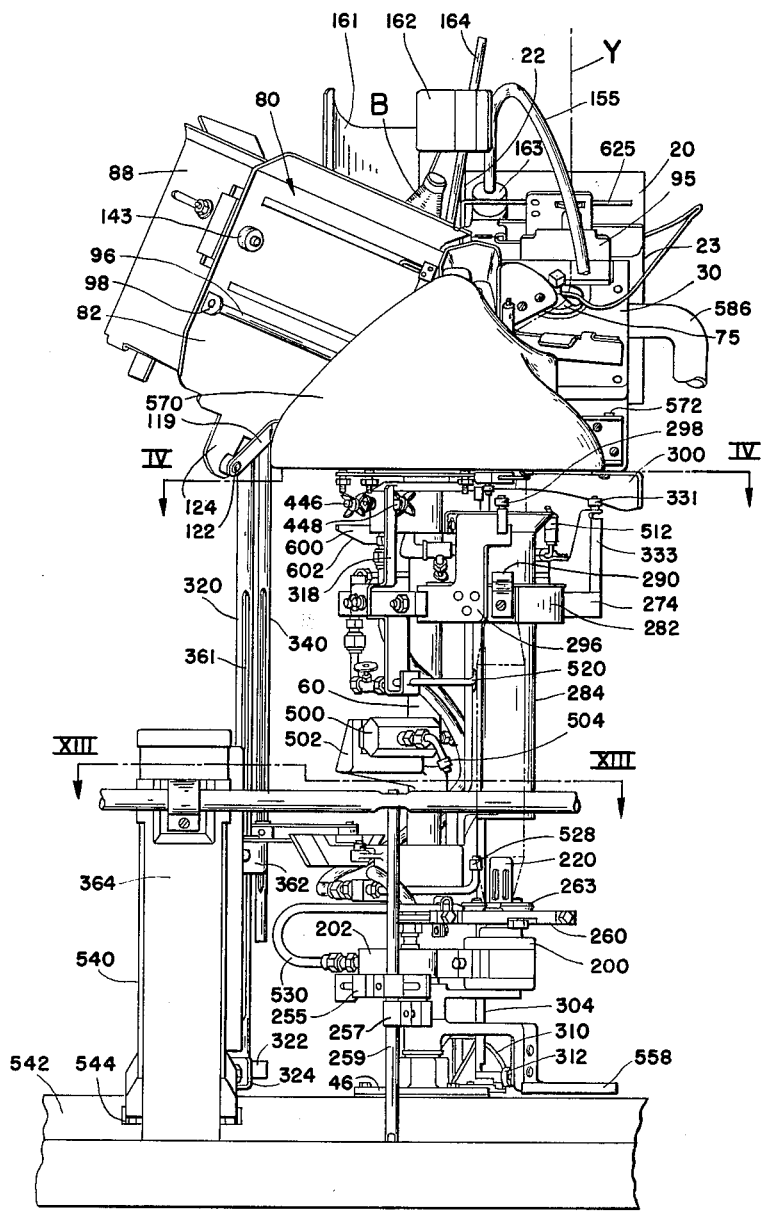
FIG. 1 is a front elevational view of an automatic winding machine incorporating a preferred embodiment of the present invention.

From a broad or general point of view the present invention may be characterized in the following manner. The housing of the yarn servicing section of the winding machine is supported from a bracket at the front end of the control case. The several devices which service the yarn on its way to the winding mandrel are mounted on top of this housing. Included in these elements are various guides, a combined yarn tensioning array and waxing attachment, and a yarn slub catcher. Spaced below the front end of the servicing section housing is a supporting frame member. A plurality of concentrically arranged shafts extend between the frame member and the bottom wall of the section housing, being journaled therein for independent rotation. The inner shaft is constantly driven by means of a driving connection for the lower end thereof beneath the supporting frame member, and the outermost shaft, which is normally held against rotation supports a single yarn package on a radially extending member.

Within the servicing section housing is a clutch for establishing a driving connection between the upper end of the inner shaft to rotate the normally restrained outer shaft as well as the package supported thereby, which clutch is of the semi-revolution type operated by a latch and is adapted to rotate the outer shaft a predetermined number of degrees to receive a reserve supply bobbin and, thereafter to deliver it to the active unwinding position.

A disc tension array is arranged concentrically with the yarn sensing pin. The bottom element of the disc tension array is stationary and the top element is movable along with the yarn sensing pin, and the camming clutch actuating member is so arranged that during the return portion of its cycle the sensing pin and the top member of the disc tension array are elevated to permit the yarn to enter the array and engage the shoulder on the pin.

At the back end of the yarn servicing section top panel adjacent the control section of the winding machine is at least one slub catcher for causing rupture of the yarn in the event of an abnormal change in the diameter thereof and the slub catcher is pivotally mounted for bodily movement toward and away from the top panel. An operating arm formed integrally with the slub catcher projects downwardly into the servicing section housing, which finger is engaged through a camming latch by means of a lever arm carried on the link connecting the clutch actuating member with the yarn end-finding means, whereby movement of the links during the end-finding cycle causes the slub catcher to be pivoted to permit the supply end of yarn to be guided thereto and then returned to operative slub catching position. On the under surface of the top panel is a suction duct connected by a flexible hose to a source of suction in the control section housing, which duct communicates with a plurality of suction openings in the top cover of the yarn servicing section housing, there being one such opening adjacent each of the slub catcher and yarn sensing and tensioning device to maintain these devices free of lint, and a third which is adapted to hold the free end of yarn coming from the reserve supply package in readiness for a change-over from one supply package to another supply package.

The supply end-finding and conveying means is in the form of a curved suction tube mounted on the control section for rotation through an arc of approximately 180° from a rest position adjacent the knotter to an end-finding position adjacent the yarn sensing and tensioning device and back again. At the end of the suction tube is a cover plate adapted to be closed by a cam provided on the service section top panel after the supply end has been drawn into the tube so as to clamp the yarn to the tube, the cover plate including cooperative knife edges to sever excess yarn and being opened at the knotter to deliver the yarn thereto.

A reserve supply bobbin magazine is located at one side of the yarn servicing section, said magazine being arranged to accommodate a plurality of fresh supply bobbins in a substantially upright position. The forward end of the magazine serves as a chamber to receive the supply bobbins one-by-one as they move forwardly in the magazine and sequentially hold each one in a readying position. A slidable plate or shelf on the floor of the chamber is shifted away to permit the bobbin to fall freely toward the supply bobbin arbor in response to actuation from translation of the yarn carrier.

The arbor is supported on a yarn carrier arranged for translation about a vertical axis below the magazine. Clutch means connect the yarn carrier to a source of power upon interruption of the winding yarn whereby the yarn carrier and its associated arbor are swung approximately 180 degrees from the active unwinding position to the unloading position. During this translation instrumentalities are operable to cam the exhausted bobbin off the arbor. At the loading position the fresh reserve bobbing is permitted to fall freely toward the arbor. Centering means are provided to insure location of the central bore of the bobbin on the arbor. The centering means is arranged to close about the arbor to locate the fresh bobbin and, thereafter to open freeing the arbor and yarn for further translation. In response to the loading of the fresh bobbin instrumentalities are activated which return the yarn carrier, with the fresh bobbin located thereon, to the active unwinding position.

Pneumatic means are operative to control the bobbin on the arbor and to introduce a free end of the fresh supply bobbin for joinder with the trailing end of a package being wound. A principal supply of air is furnished to an air valve housing arranged for rotation cooperatively with translation of the yarn carrier. A control plate operates valves within the housing block. As a fresh reserve supply bobbin is positioned on the arbor of the yarn carrier and the carrier commences its return cycle to the active unwinding position the arbor is inflated to bear fast on the inner wall of the bobbin bore and is rotated by an air driven motor operated from a valve within the housing block. During rotation of this bobbin air is forced against the lower windings of yarn on the bobbin to force them downwardly into rotating cutters to cut the lower windings and provide a free end. Thereafter, and simultaneously with the shutting off of the downward air blasts an upward air blast causes the loose end of the supply bobbin to be blown upward. A jet of air directed against the upper tip of the bobbin restrains the upper wraps of yarn on the bobbin from sloughing off. The upward air flow conveys the loose yarn end into a bonnet which guides the end into the suction opening in the top panel of the yarn servicing section for retrieval by the swingable suction tube, already alluded to. Air being directed into the air motor is advantageously vented adjacent the cutters on the yarn carrier. A stationary suction hole receives the clipping produced by the cutters, which clippings are blown thereto by the vented air.

As the supply bobbin on the yarn carrier reaches its active unwinding position the air motor vent is closed.

This serves to stop rotation of the arbor rapidly but to keep the arbor inflated for securing the bobbin in position for unwinding. Upon exhaustion of the active unwinding bobbin the air motor is vented to release the bobbin for subsequent ejection and the air supply to the motor is shut off almost simultaneously therewith preparatory to reloading of a fresh bobbin after which the cycle is repeated.

MAIN ELEMENTS OF THE WINDING UNIT

Before commencing the detailed description of the drawings, it should be brought out that while the invention is capable of adaptation to various types of winding machines, it was specially designated for use in the fully automatic machine of U.S. Patent 2,764,362 and is shown in association with the control section of that machine. However, only so much of the unmodified structure of that machine has been set forth in the drawing as is necessary to an understanding of the relationship between that unmodified structure and the structure of the invention. It will also be appreciated that while the present illustrations and descriptions have been and will be confined to the structure situated at a single winding position, the commercial form of a complete winding machine embodying the invention will more often be of the gang type in which a plurality of assemblies will be mounted upon a common frame to wind a plurality of strands of yarn and will be driven from a common source of power.

Moreover, in the commonly assigned patent application of Thomas E. Pitts et al. entitled "Automatic Supply Package Indexing Mechanism for Winding Machines" S.N. 30,346 filed May 19, 1960, now Patent No. 3,081,045 there is disclosed and claimed a self-initiating supply package indexing mechanism for winding machines, particularly of the fully automatic type covered by the aforesaid U.S. Patent 2,764,362. Certain features of the structure of that application are set forth herein. Briefly, in accordance with the invention of that application on an active yarn supply package is disposed on a carrier at the supply end of the winding machine. In turn, the carrier is arranged to rotate about a vertical axis to present a reserve supply package for unwinding in the event the yarn on the active supply package should become exhausted or break. The means for initiating rotation of the carrier of the present invention being generally akin to that disclosed in said application S.N. 30,346, it is not deemed necessary to recite that means in detail herein. However, so much of the unaltered structure of that invention will be presented herein as is deemed necessary to a complete understanding of the present invention. In order to facilitate a correlation between the present invention and the remainder of the machine as described in the aforesaid U.S. Patent 2,764,362 and United States patent application S.N. 30,346, now Patent No. 3,081,045, the unmodified components thereof will be identified with the same numeric designations as are employed in said patent and application.

Figure 30:
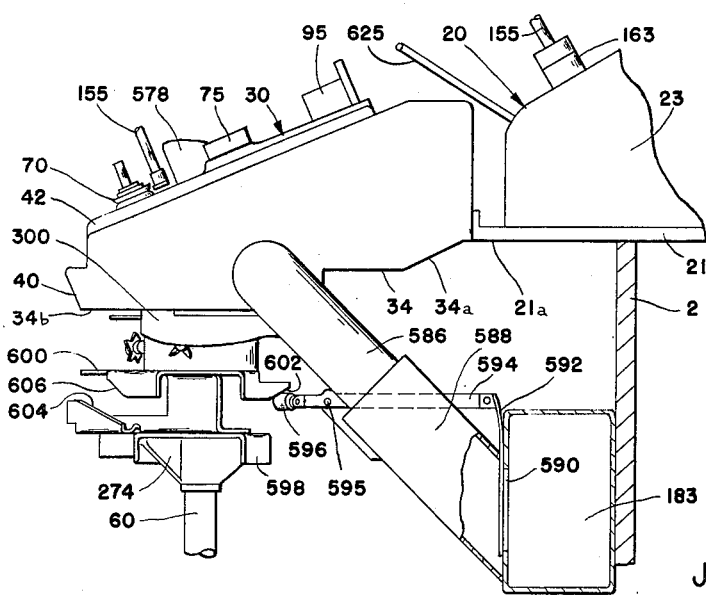
FIG. 30 is a fragmentary side elevational view of the winding machine illustrating details of the suction operating mechanism.

With particular reference to FIGS. 1 and 30 of the drawings, the housing of the control section for the winding system consists mainly of a U-shaped frame 20 comprised of a horizontally extending base 21 and upstanding sidewalls 22 and 23. Frame 20 rests upon a bed supported from the floor, part of the bed being indicated at 2. The end-finding and conveying means for the supply end of yarn projects forwardly from frame 29 and consists of an inverted, generally U-shaped tube 155, of which only the lower end portion can be seen in FIG. 30. The end of tube 155 adjacent the frame 20 is received within a sleeve 163 journaled for rotation in a bracket (not shown) which is secured to the base 21 of the frame.

Also situated in front of the frame 20 is a thread breakage lever 625 (shown in FIG. 1) extending transversely across the path of the yarn on its way to the winding section (not shown) of the machine. As is explained in the previously dentified patent, breakage lever 625, by swinging upwardly from its depressed running position as in FIG. 1 upon interruption in the flow of the thread thereover, furnishes the machine with an indication that the thread has been broken and this indication sets into motion a sequence of operations in the course of which the end-finding means are actuated to seek out the respective ends of the broken yarns, convey them to the knotting means to be reunited, and set the machine again in operation. This sequence of operations may be referred to as an end-finding and typing cycle. By means fully disclosed in the cited patent rotation of supply end-finding tube 155 by virtue of the meshing relationship with various gears, whereby tube 155 is swung from a retracted rest position adjacent the upper forward end of frame 20 and the knotter (not shown), downwardly and forwardly to seek out and engage the supply end of the broken thread, after which tube 155 is returned to initial position to convey this end to the knotter to be united with the end of the broken thread from the package being wound. The position of the forward end of tube 155 (shown in FIG. 1) is approximately that of the tube on its way to seek out the supply end. Tube 155 is hollow throughout its length and the bore thereof communicates with a suitable bore (not shown) which, in turn, communicates with a suction or vacuum chamber 183 extending below base 21 of frame 20.

The parts of the machine thus far described as well as their function are precisely the same as in the previously identified U.S. Patent 2,764,362 and reference may be made to that patent for a more complete description thereof than it is possible to provide here. These parts have no essential relationship to the subject matter of the present invention and are, in fact, pertinent here primarily because of the fact that the supply end-finding means of the patented machine is a convenient source of motion for driving certain operative parts of the invention. The motivation of the parts of the invention could, of course, be accomplished independently of the end-finding means of the patented machine. In any event, the subject matter of the invention is preferably associated with the patented machine and the description thus far will at least facilitate an understanding of the preferred context in which the invention is utilized.

Turning again to FIGS. 1 and 30 of the drawing the reference numeral denominates a yarn servicing housing seen as forwardly extending from the forward extension 21a of base 21 of frame 20. This housing is generally shaped as an elongated box for enclosing certain operating elements of the winding machine and supporting others thereon. Housing 30 is generally comprised of a bottom wall 34 having an inclined rear portion 34a affixed at the rear end thereof to the forward end of frame extension 21a, and a horizontal front portion 34b, right and left wide walls 36 and 38, FIG. 6, a front wall 40, and a top panel 42. All of the walls are formed integrally except top panel 42 which is removable in the manner of a cover. At its rear end adjacent the control section of the machine housing 30 is at least partially open to accommodate certain operating links. Top panel 42 mounts certain yarn servicing instrumentalities including a tension unit 70, a waxing attachment 75 and a slub catcher 95 for purposes as described in the afore-cited patent.

RESERVE BOBBIN SUPPLY MAGAZINE

As herein illustrated the present invention includes a magazine for retaining reserve supply bobbins B in position for ready transference, one by one, to a yarn carrier. Accordingly, and referring to FIG. 1, the magazine 80 is affixed to side 38 of yarn servicing housing 30 by suitable means such as bolts, not illustrated, which pass through holes provided in a wing-like extension 89 (see FIG. 7) projecting generally forwardly from a side wall 82. In addition to wall 82 magazine 80 is comprised of a further fragmentary or partial side wall 84 which is oppositely disposed from wall 82. The two walls are connected by a bottom wall or floor 86. Advantageously, the magazine is mounted at a compound angle to the floor so that, in its longitudinal dimension, it inclines downwardly as it extends rearwardly toward frame 20, as seen in FIG. 1. At the same time magazine 80 is tilted somewhat forwardly, so that, in its transverse dimension, its top inclines outwardly, i.e., toward the viewer as seen in FIG. 1. So situated, reserve bobbins B laying in a generally upright position with their longitudinal axes perpendicular to the surface of bottom wall 86, will lean against wall 82. Also, their axes incline somewhat rearward and downwardly following the alignment of floor 86 of the magazine. By the foregoing arrangement the reserve bobbins B tend to gravitate generally downwardly, that is away from end panel 88 to a suitable position for transference to the yarn carrier. In order that the reserve bobbins will not shift and, therefore, possibly fall over in the magazine light pressure is applied against the sides of bobbins to urge them against wall 82 by a movable plate 90. Said plate 90 is hinged at 90b to a base plate 91 which is, in turn, securely fastened to an extension 86a of floor 86 by screws 93 (see FIG. 6). Plate 90 is biased by a leaf spring 92 to bear on the diameter of the bobbins laying in the magazine. The lower end of spring 92 is firmly connected to extension 86a of floor 86 by any suitable means. The upper end of spring 92 bears against the side of plate 90. Plate 90 flares into a wing-like edge at 90a to facilitate easy loading of reserve bobbins in the magazine. A generally circular chamber 94 forms the forward end of the magazine 80, this chamber being defined by a relatively high wall adapted to receive one bobbin at a time in an upright position.

Referring now to FIGS. 6 through 12, it is desirable in the course of operation of the magazine that positive means be provided to assist the gravitational urging of succeeding reserve bobbins into chamber 94. In this connection a rod 96 which is supported in a pair of spaced brackets 98 and 99 extends longitudinally along substantially the full rear side of wall 82. An angular element or "slider" 100 is mounted on rod 96, the rod serving as a track along which the slider is movable. Slider 100, in turn, supports a pair of elements 102 and 104 which are joined together by a pin 105, extending through a section of slider 100, for rotation about a vertical axis, each of these elements being aligned with an elongated slot 106 and 108, respectively, in the side of wall 82 (FIGS. 9–12). A horizontally positioned U-shaped member or "pusher bar" 110 is secured at its opposite terminal ends to elements 102 and 104 respectively and projects through slots 106 and 108. The main U-shaped body of the pusher bar 110 is disposed on the opposite side of wall 82 from the elements 102 and 104, i.e., projecting into the bobbin holding channel of the magazine. A flat link 112 is supported on a pin 114 embedded in the lower end of slider 100. Link 112 extends upwardly from its mounting pin 114 and is connected through an upwardly projecting stud 116, affixed at the upper end of said link, to one side of element 102. Pin 114 affords limited rocking movement to link 112 for purposes to be explained hereafter.

Figure 7:
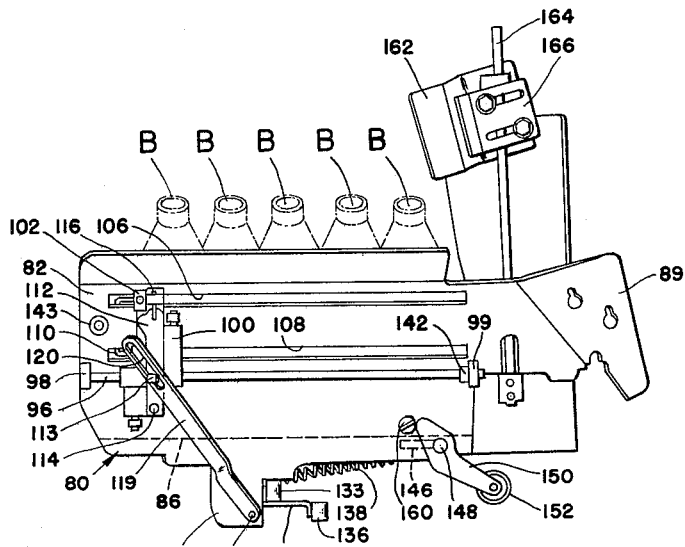
FIG. 7 is an elevational view of the bobbin magazine.
Figure 8:
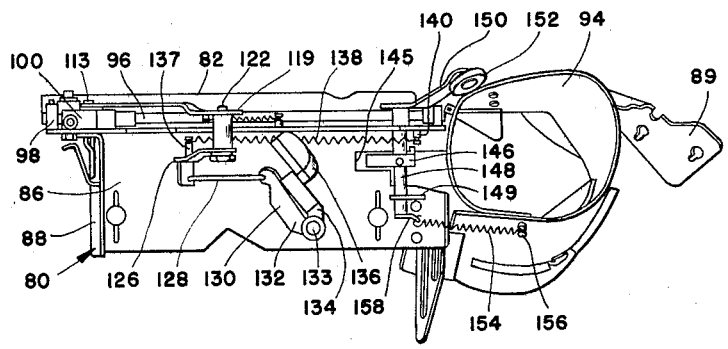
FIG. 8 is a bottom plan view of the bobbin magazine of FIG. 7.

A relatively long arm 119 is connected near its upper end to link 112 by a flat-headed stud 113 which loosely passes through an extended slot 120 in arm 119 and is embedded approximately at the midpoint of the link. The distal end of arm 119 is secured for rockable movement on a post 122 suitably journaled for rotation in a tab 124 depending from wall 82 (see FIG. 7). Post 122 projects through tab 124 and mounts on its end opposite to arm 119, a short link 126 (FIG. 8) which projects essentially upwardly therefrom in a position beneath the magazine floor 86. A horizontally disposed rod 128 is attached at one of its ends to the uppermost end of the short link 126 and is connected at its other end to one fork 130 of a bifurcated swivel member 132 rotatably supported on a stud 133 depending from floor 86. With continuing reference to FIG. 8 the opposite fork 134 of swivel member 132 mounts an anvil 136 which is pushed by means yet to be described to operate the linkage just related for actuating arm 119. A spring 138 is extended between a stud 140, pierced through the forward lower side of wall 82, and a pin 137 engaged in the upper end of link 126. So located, spring 138 biases arm 119 forwardly, or clockwise as viewed in FIG. 7, in turn causing pusher bar 110 to exert a force against the bobbins B in magazine to push them toward chamber 94. A resilient collar 142 made of rubber or the like is mounted on rod 96 between bracket 99 and slider 100 to absorb the shock of the slider as it is thrust forward by spring 138. Similarly, a corresponding bumper 143 is located in wall 82 adjacent the opposite end of rod 96 to absorb the energy of the rearward thrust of slider 100. Further, contact of link 112 with bumper 143 during the rearward sweep of arm 119 will serve to rock the link 112 clockwise on its pivot 114 (FIG. 7) thereby swinging pusher bar 110 outwardly perpendicular to wall 82.

Figure 6:
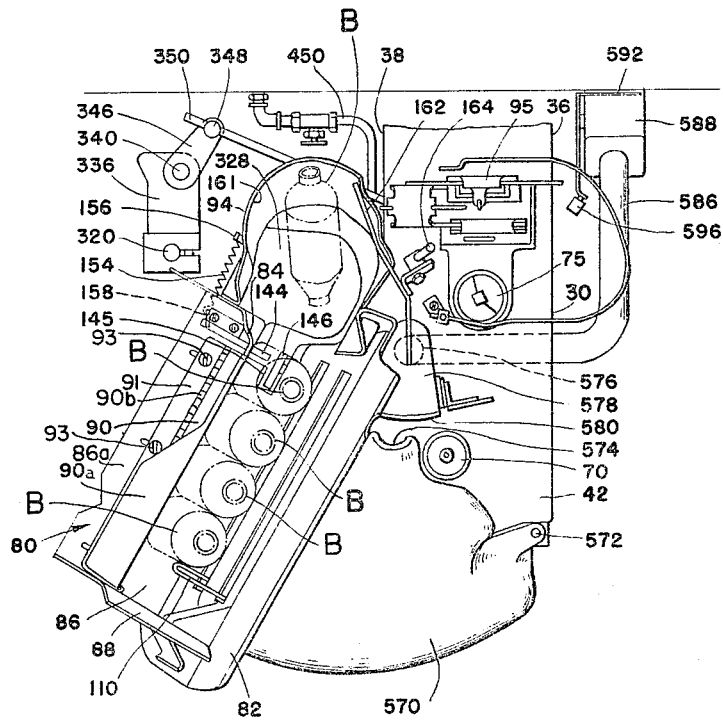
FIG. 6 is a top plan view of the winding machine and illustrating the bobbin magazine in its operative relationship therewith.

As best seen in FIG. 6 a bobbin stop 144 in the form of an upstanding rib is fastened to the top of floor 86 of the magazine and extends transversely thereto immediately adjacent chamber 94. Stop 144 serves to receive the base of the forwardmost bobbin in the magazine thereagainst, thus preventing the free movement of the supply bobbins into chamber 94. Positioned closely behind stop 144 in a longitudinal slot 145 (FIG. 8) provided in floor 86 is a segment 146 secured to a rotatable stub shaft 148 journaled at one of its ends in wall 82 and held at its opposite end in a boss 149 for rockable movement about a horizontal axis (FIG. 8). The end of stub shaft 148 projecting outwardly beyond wall 82 supports an offset arm 150 which inclines somewhat downwardly (FIG. 7) and carries a cam follower 152 at the lowermost end thereof. As will be explained shortly cam means are provided which rock arm 150 clockwise as viewed in FIG. 7. This motion rocks segment 146 upwardly causing it to contact the bottom of bobbin B and lift it upwardly for a distance, said rocked positions of the arm 150 and segment 146 being depicted by the broken lines in FIG. 7. Since the vertical "throw" of segment 146 is greater than the height of stop 144 the base of bobbin B will be elevated above the stop. At this point pusher bar 110 acts to push the bobbin forwardly over the stop and into chamber 94. A spring 154 (see FIG. 8) is extended between a pin 156 in the wall of chamber 94 and a pendant 158 on the inner end of stud 148 adjacent boss 149. Spring 154 serves to bias segment 146 into its inoperative position, i.e., to rotate it counterclockwise on stub shaft 148. The extent of this counterclockwise movement is limited as arm 150 contacts a screw 160 projecting into its path from the side of wall 82.

Turning again to FIGS. 1 and 6 the rear section of chamber 94 has a relatively high wall 161 which acts to contain the reserve supply bobbin received therein in essentially an upright position. In order that the bobbin, as it is transferred into chamber 94, will not inadvertently tip over, a guide plate 162 is positioned atop a standard 164 affixed to the lower end of the chamber. The guide plate 162 acts to direct the bobbin vertically into chamber 94 while the bobbin is being shifted by segment 146. Guide plate 162 extends from a point approximating the upper forward terminal end of wall 82 and terminates closely adjacent one edge of wall 161. An adjustable bracket 166 serves to mount guide plate 162 on standard 164 and affords adjustment of the guide plate vertically to accommodate bobbins of varying lengths.

Figure 12:
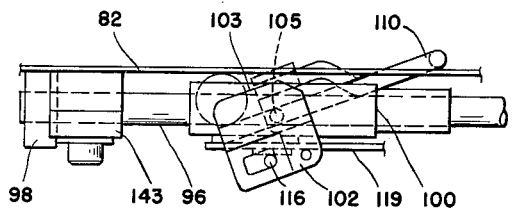
FIG. 12 is a top plan view corresponding to FIG. 11.
Figure 10:
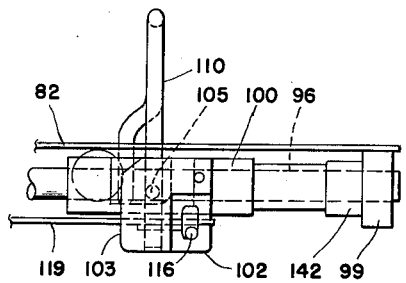
FIG. 10 is a top plan view corresponding to FIG. 9.
Figure 11:
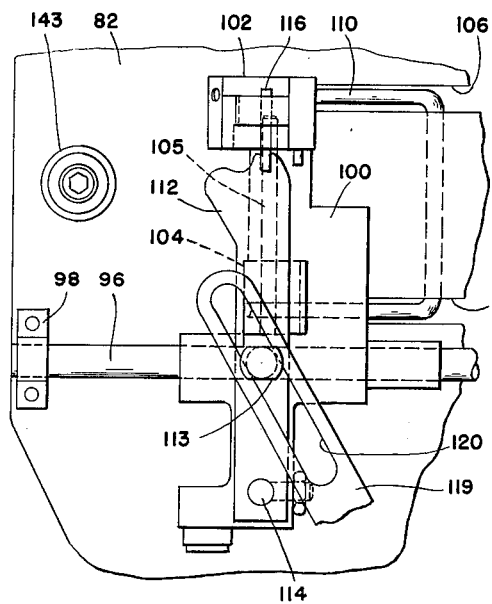
FIG. 11 is a view corresponding generally to FIG. 9 but illustrating the parts in a different position.
Figure 9:
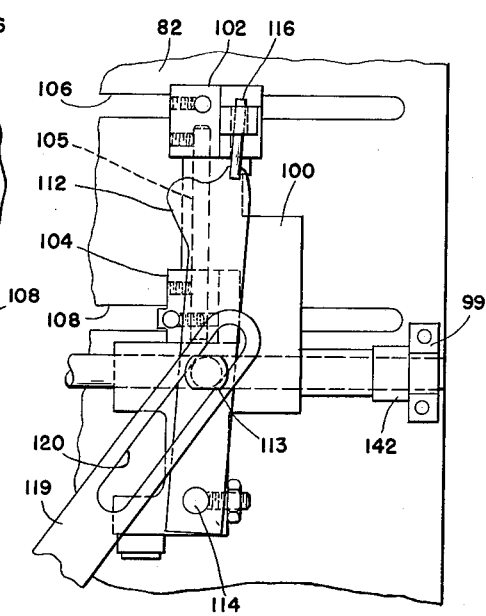
FIG. 9 is an enlarged fragmentary view, partly in section, of parts for controlling the operation of the bobbin magazine.

Advantageously, pusher bar 110 is actuated through a pushing cycle after each occurrence of a new bobbin being loaded from the main magazine channel into chamber 94. This insures that the pusher bar will always retreat behind and gather in any reserve supply bobbins which have been loaded manually into the magazine. Thus, as anvil 136 is cammed to the left as viewed in FIG. 7 by means yet to be explained arm 119 is rocked correspondingly counterclockwise carrying pusher bar 110 along therewith. In consequence of this rocking of arm 119 slider 100 and its associated elements are pushed to the rear of the magazine, i.e., to the left viewing FIG. 7. By virtue of the fact that the arm 119 and slider 100 are connected through stud 113 and flat link 112 the initial force from the arm 119 causes link 112 to rock a slight amount about pin 114 in a counterclockwise direction, see FIGS. 7, 9 and 11. Such rotation causes element 102, connected to link 112 by pin 116, and element 104 which is operably joined with element 102 through pin 105, to rotate clockwise from the position illustrated in FIGS. 9 and 10 to the position of FIGS. 11 and 12. Pusher bar 110 is thereby, in effect, collapsed against wall 82, as best seen in FIG. 12, and will slide rearwardly in the magazine without affecting the position of any upright bobbins standing therein. With the release of anvil 136 from its camming means slider 100 will have reached its rearward or retracted extreme. In this location link 112 is caused to contact bumper 143 resulting in the link being rocked forward abruptly. This causes elements 102 and 104 to pivot clockwise to the position of FIG. 10. As a consequence thereof pusher bar 110 is swung outwardly extending transversely of the channel of magazine 80 and, so arranged, will obviously engage with the rearmost bobbin B in the magazine. Spring 138 will cause pusher bar 110 to exert a continual biasing force which is transmitted through all of the bobbins and will eventually serve to push the bobbin nearest to chamber 94 over stop 144 at the appropriate time as previously related. During this forward pushing movement pusher bar 110 cannot swing away from the bobbins, that is, it cannot swing further counterclockwise as viewed in FIG. 10 since element 102 is flatted on one of its sides 103 to bear against the rear side of wall 82 when rotated to the point where pusher bar is fully extended into the path of the bobbins, see FIG. 12. However, element 102 does have a suitable radius on one corner which permits movement of the pusher bar in the quadrant from wall 82 as shown in FIG. 10 to its fully extended position as illustrated in FIG. 12. From the foregoing construction it will be appreciated that whenever arm 119 is moved counterclockwise about post 122 (FIG. 7) pusher bar 110 will assume the position of FIG. 12, i.e., collapsed against wall 82. Conversely, at such times as arm 119 is moved in the opposite direction, pusher bar 110 will be swung outwardly as shown in FIG. 10.

YARN SUPPLY CARRYING MEANS

Figure 2:
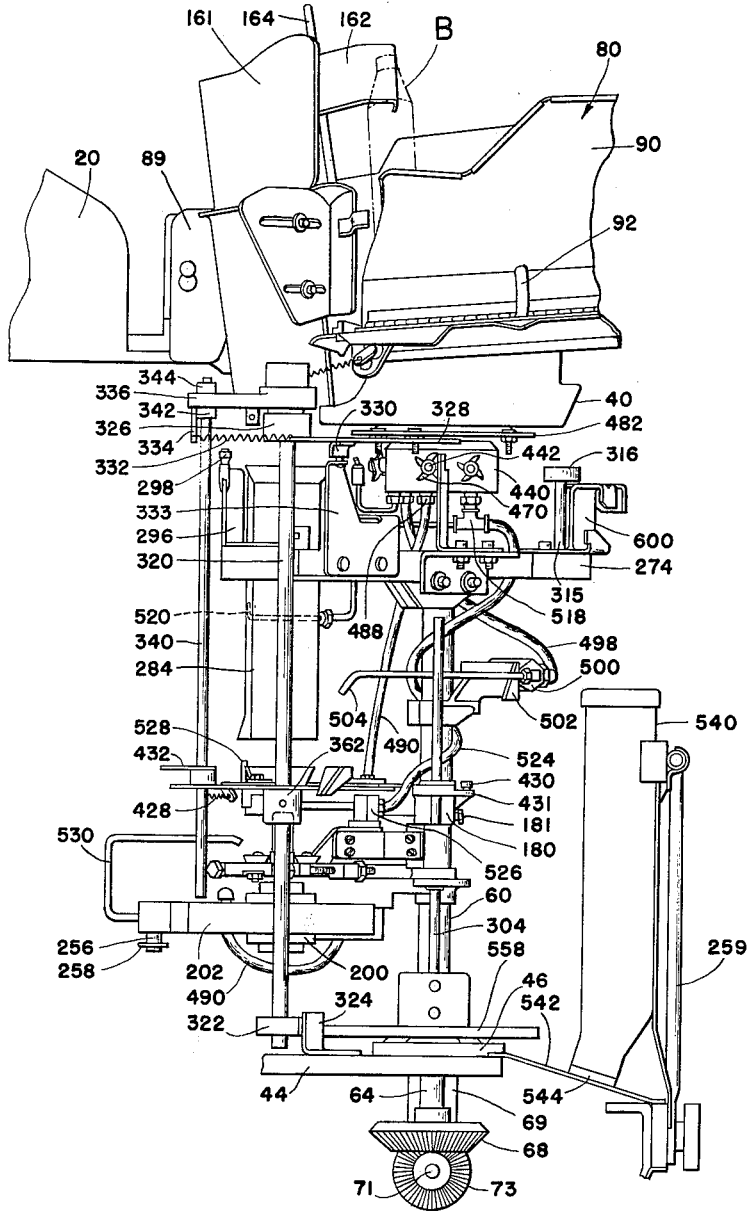
FIG. 2 is a side elevational view of the winding machine of FIG. 1, certain parts thereof being omitted, and illustrating the yarn carrier in the loading position.
Figure 3:
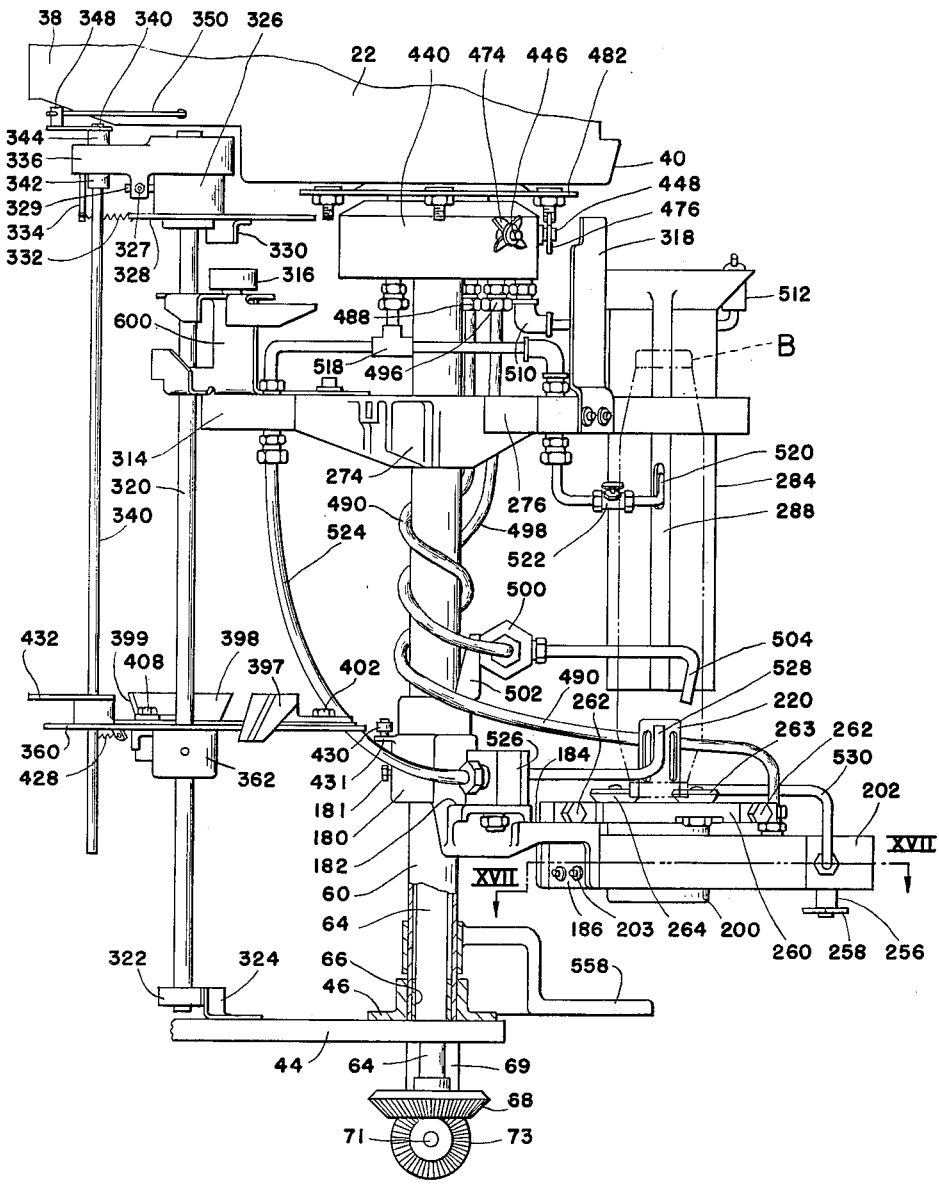
FIG. 3 is a view similar to FIG. 2, on an enlarged scale with certain parts being omitted, illustrating the yarn carrier in its active unwinding position.

Viewing FIGS. 2 and 3 a rail 44 is situated beneath the front end of housing 30. Rail 44 constitutes a part of the frame of the machine and is held in fixed spaced relationship to the floor or other surface upon which the machine rests, the support for rail 44 and the other fixed frame member not being illustrated herein. A pedestal bearing 46 is mounted on the top surface of rail 44. A hollow, tubular and rotatable shaft 60 is journaled at its lower end in said pedestal bearing 46. At its upper end shaft 60 projects through an aperture in the horizontal portion 34b of the lower wall 34 of housing 30, a bushing 61 being interposed between the aperture edge and the shaft surface (see FIG. 5).

A second shaft 64 extends through the length of tubular shaft 60, being held in concentric relationship therewith by means of a further bushing 66, so as to be rotatable independently of tubular shaft 60. At its lower end internal shaft 64 passes through and beyond pedestal bearing 46 and rail 44, terminating with a bevel gear 68. Depending from the lower surface of rail 44 is an arm 69 (FIGS. 18 and 19) which supports a shaft 71 for free rotation carrying at its free forward end a bevel gear 73 having meshing relationship with bevel gear 68. Shaft 71 extends rearwardly from rail 44 beneath the machine and is connected at its rear end, in a manner not illustrated, to a suitable source of power so that, during the operation of the machine, shaft 71 undergoes constant rotation and transmits that rotation to internal shaft 64. In turn, the external shaft 60 is periodically rotated through an arc of 180 degrees by actuation from the internal shaft 64. To this end a clutch mechanism is contained within housing 30 for coupling and uncoupling these two shafts, as desired, to effect the aforesaid rotation of the external shaft. Further reference to said clutch mechanism will be made hereinafter.

Figure 13:
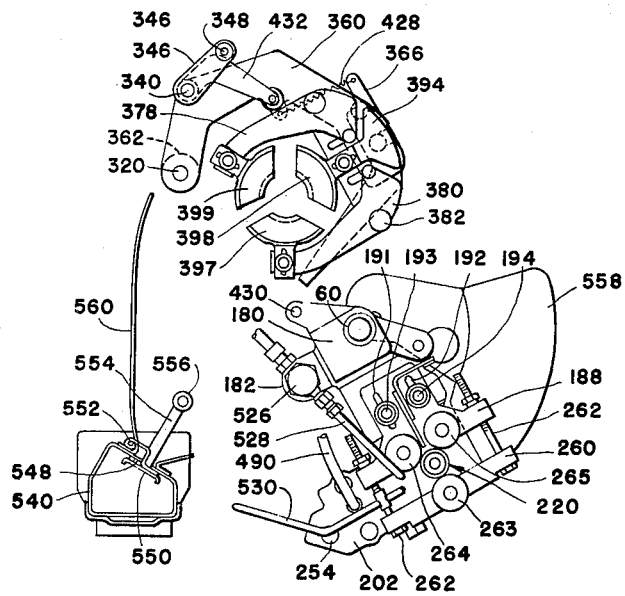
FIG. 13 is an enlarged sectional view taken along lines XIII—XIII of FIG. 1.

The mechanism thus far described is adapted to impart translation to a carrier for yarn supply bobbins and in the course of such translation to motivate certain actions to the end that an exhausted supply bobbin may be removed from the winding position, a fresh reserve supply bobbin positioned in its stead and the lead end of the fresh bobbin threaded into the winding machine. Accordingly, and with reference to FIGS. 1–3 and 13–15 the yarn carrying mechanism is mounted fast to tubular shaft 60 by a bracket 180 which is secured to the diameter of shaft 60 by a pressure screw 181. Bracket 180 extends laterally from shaft 60 and is provided with a pair of horizontal steps 182 and 184 and terminates at its outmost end in a tab 186 projecting downwardly from step 184. Step 184 presents a rather broad, flat surface for supporting a generally T-shaped member 188, FIGS. 13–15. The central leg 190 of member 188 has a pair of oppositely disposed elongated slots therein as at 191 and 192 through each of which is passed a broad-headed clamping screw 193 and 194, the screws 193 and 194 being threaded into the top surface of step 184. Member 188 may thereby be adjusted relative to step 184 within the limits of slots 191 and 192, the screws 193 and 194 acting to secure the member in a selected position.

In practice with the present invention it is desirable that means be provided to rotate the supply bobbin. Thus, with reference to FIGS. 13–15, an air motor 200 is held fast to a valve block 202 the valve block, in turn, being attached to tab 186 by screws 203. As shown in FIG. 17 air motor 200 is provided with a central cavity 204 which receives a plurality of air vanes 206, here illustrated as four vanes equidistantly oriented around a circular body 207. The body 207 is offset from cavity 204 so that air may be received in the cavity for rotating the vanes. An upstanding spindle 208 (FIG. 16), having an axial bore 210 through generally the upper half thereof, is held fast to the circular body 207 and supported in suitable bearings for cooperation rotation therewith. A cap 212 is fitted over the upper terminal point of spindle 208 and held in place by screw 213. Cap 212 extends upwardly from spindle 208, projecting beyond the horizontal level of member 188, and has a central passage therethrough at 214 communicating with bore 210 and terminating in a pair of radial apertures 215.

Figure 16:
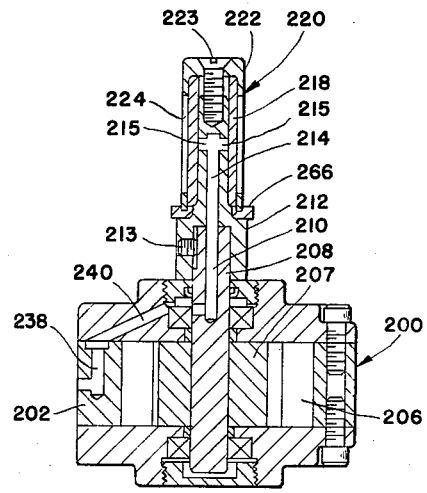
FIG. 16 is an enlarged sectional view showing the air motor and related elements for operating the inflatable arbor.
Figure 17:
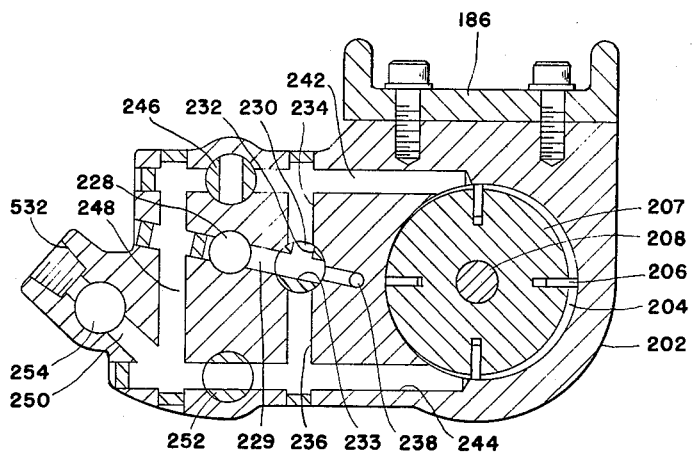
FIG. 17 is a view taken along lines XVII—XVII of FIG. 1.

As seen in FIG. 16 cap 212 includes an upper section of reduced diameter. This upper section is enclosed by an inflatable arbor 220 comprised of an expandable, airtight diaphragm 218 and a surrounding hood 222. Diaphragm 218 is sealed to cap 212 to prevent any air leakage therebetween. Hood 222, in turn, encloses diaphragm 218 and is held in position by a screw 223 engaged in the upper end of cap 212. In order that the inflatable arbor 220 may be operable to engage a bobbin, a hood 222 thereof is provided with a plurality of elongated chordal slots 224 located equidistantly around its circumference. Each slot 224 affords an aperture through which a section of diaphragm 218 may be distended outwardly under air pressure. Thus, it follows that a bobbin which is placed with its internal bore on the inflatable arbor 220 will be secured by the frictional gripping of those portions of diaphragm 218 which have been expanded beyond the circumferential bounds of hood 222 and into contact with the bobbin. It will be apparent that, desirably, the internal bore of the bobbin should be of such diameter to conform closely to the outer diameter of inflatable arbor 220 to afford maximum gripping pressure thereon. At the same time, it is desirable that the bobbin be movable freely down onto arbor 220 under its own weight for rapid positioning thereon.

Valve block 202 has been described previously as being secured to tab 186 of bracket 180, and being connected in air tight relationship with air motor 200 at one side thereof. Block 202 is provided with a series of rotatable tapered valves and connecting air passages for regulating the rotation of spindle 208 and its connected components. To this end a main air intake port arranged with a suitable fitting is provided at 228 (FIG. 17). This port, in turn, is connected through passage 229 with a tapered rotatable valve 230. Valve 230 has a generally T-shaped orifice therethrough including a short straight passage 232 extending part way through the valve and interconnected with a transverse passage 233 which projects completely through the valve. The valve 230 is adapted to be turned so that transverse passage 233 may be aligned with one of a pair of oppositely located passages 234 or 236 in valve block 202. The straight passage 232 communicates with an aperture 238 in the wall of air motor 200, see FIG. 16. Aperture 238, in turn, connects with an air inlet 240 for admitting air from intake 228 to central passage thus providing air to the interior of arbor 220 from radial openings 215. The arbor may thus be inflated to bear against and firmly hold supply bobbin B′.

Passage 234, previously referred to as being under the control of valve 230, joins with an air passage 242 along the intermediate run of said passage 242, while, in like manner passage 236 unites with an air passage 244 oppositely from passage 242. Air passage 242 opens at one of its ends into air cavity 204. A rotatable valve 246 is interposed between passage 232 and the terminus of passage 242 remote from cavity 204. Valve 246 is provided with a transverse bore extending therethrough to admit air from passage 242 to an escape passage 248 connecting with a discharge duct 250.

Passage 244 connects into air cavity 204 at one end of its ends and joins with discharge passage 250 at its opposite end. A rotatable valve 252 having a transverse hole therethrough which may be rotated into alignment with passage 244 is disposed in said passage between passage 236 and passage 250. An exhaust valve 254 is positioned in discharge passage 250 and has a bore therein capable of rotation to control the emission of air from cavity 204. Advantageously, each of the valves 230, 246, 252 and 254 are provided with means such as a suitable slotted head to afford manually rotation thereof. Additionally, and for purposes that will be more fully explained hereafter, exhaust valve 254 has a depending stem 256 (FIGS. 2 and 3) which penetrates through the bottom of block 202. A star wheel 258 having four equidistant radially projecting fingers is held fast on the lower end of stem 256. During translation of the yarn carrier star wheel 258 is rotated automatically and alternately by trip dogs 255 and 257 (FIGS. 1 and 4) adjustably connected to a rod 259 supported in rail 44 of the machine to control the movement of exhaust valve 254.

In order that the direction of spindle rotation may be controlled through the valve 230 said valve is rotated to direct the air admitted from port 228 either to passage 242 or 244, the particular direction thereby controlling the side of cavity 204 which will eventually receive the air. If the valve 230 is rotated to align short passage 232 with passage 234 air will be directed to passage 242 and, in turn, to cavity 220 in a manner to propel the air vanes 206 and spindle 208 in a clockwise direction as viewed in FIG. 17. Under this arrangement valve 246 would be closed to force the air into the cavity and valve 252 would be open to permit the air to be exhausted through passage 244, valve 252, duct 250 and valve 254. Conversely, if the spindle 208 is desired to be rotated in a counterclockwise direction (FIG. 17) valve 230 would be rotated so that the air which is transmitted thereto would pass out passage 232 to passages 236 and 244 and into the opposite side of cavity 220 from that previously described in connection with the opposite rotation. Valve 252 would be closed to prevent escape of air thereby and valve 246 would be opened. The air which was forced into the cavity 220 would thereupon be exhausted through passages 242 and 248 and out through duct 250. Valve 254 would, of course, be open to permit the air to escape. Through the foregoing advantageous arrangement the direction of rotation for bobbin B may be determined to satisfy the particular requirements for unwinding thereof.

Air motor 200 has been described as being situated closely adjacent to the outer end of member 188. As seen, for example, in FIGS. 1 and 3 the inflatable arbor 220 projects upwardly above member 188 in a position to receive a bobbin thereon. A bar 260 is slidable on a pair of bolts 262 pierced through the outer terminal ends of member 188. Bar 260 mounts a freely rotatable cutter wheel 263 approximately midway therealong, the cutter wheel 263 having a tapered peripheral edge for contacting the outside diameter of hood 222 of inflatable arbor 220. In a similar manner a pair of companion cutter wheels 264 and 265 possessing tapered outer edges are supported for free rotation on member 188, the cutter wheels 264 and 265 being somewhat spaced to avoid undesired rubbing one with the other but each contacting hood 222 of inflatable arbor 220. Advantageously, hood 222 may be provided with a sleeve or band 266 of tool steel or the like adjacent its lower edge which provides a wear and cutting surface against which the cutter wheels may bear and from which said wheels may be frictionally rotated. It will be seen that bar 260 can be adjusted along bolts 262 to present cutter wheel 263 against sleeve 266 on hood 263 for rotation therewith. Similarly, member 188 is adjustable along step 184 to position the two further cutter wheels 264 and 265 against generally the opposite side of hood 263 for driving contact against sleeve 266.

Additionally, it is to be noted that the three cutter wheels 263, 264 and 265, and sleeve 266 act as alternative stops on which a bobbin mounted on arbor 220 can rest. Should a bobbin be of extremely close fit on the arbor, i.e., if the internal diameter of the bobbin at its lower end corresponds very closely to the outside diameter of hood 222, the bobbin will sit on sleeve 266. If it occurs that the internal bobbin diameter is of such size that passes beyond sleeve 266, the cutter wheels act to stop its downward movement past the arbor.

BOBBIN BALLOON CONTROL AND EJECTOR

Figure 4:
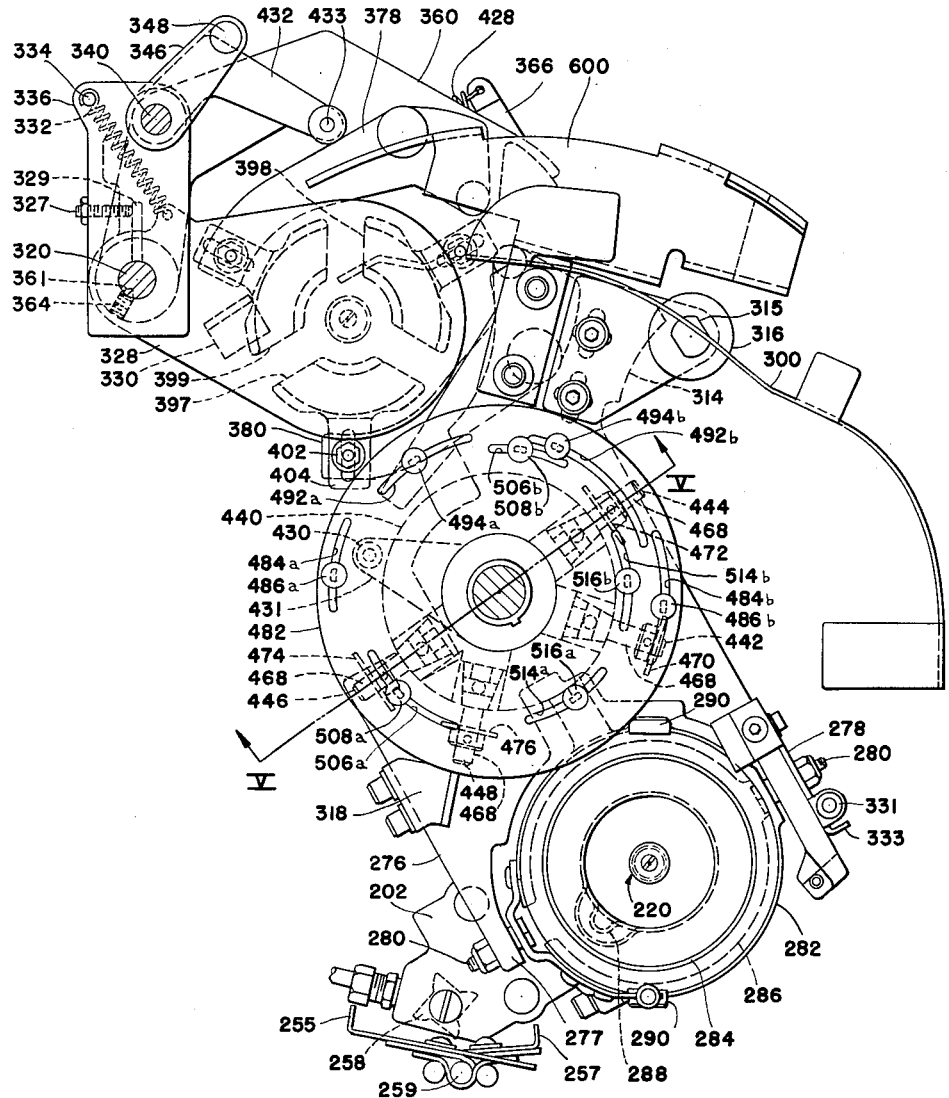
FIG. 4 is an enlarged sectional view taken along lines IV—IV of FIG. 1.
Figure 18:
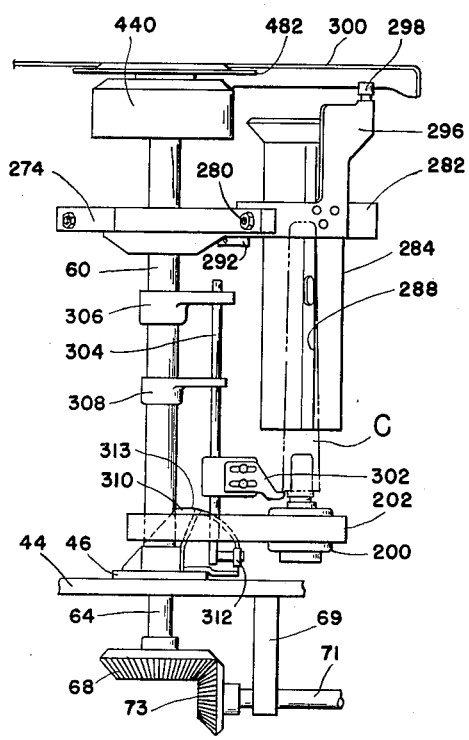
FIG. 18 is an elevational view of the yarn carrier with parts removed to illustrate the bobbin ejecting mechanism in its inoperative position.
Figure 19:
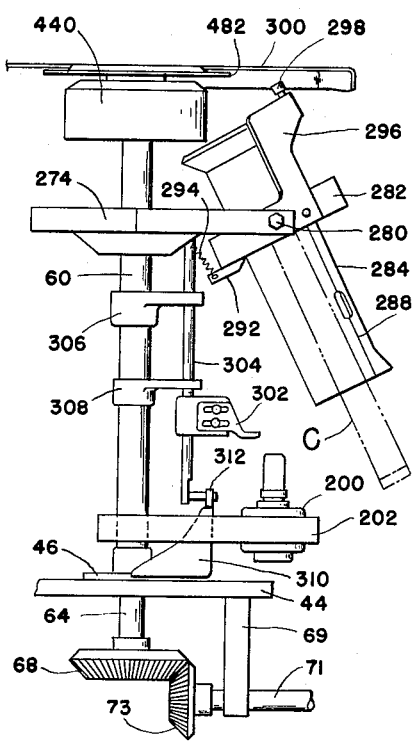
FIG. 19 is a view corresponding to FIG. 18 but illustrating the parts in a different position.

In conjunction with the means for rotating the yarn supply bobbin there is provided means for controlling the yarn balloon during unwinding, said means also being adapted to assist in ejecting the exhausted bobbin. To this end there is affixed on tubular shaft 60 at a point spaced upwardly from bracket 180 a further bracket 274, see FIGS. 18 and 19 having a horizontally disposed arm 276. The arm 276 is bifurcated so as to provide a pair of branches 277 and 278 which project laterally spanning a vertical plane passing through the axis of inflatable arbor 220 (FIG. 4). Midway along the branches 277 and 278 each is provided with a horizontally arranged post 280 which projects inwardly and are loosely received in opposite sides of a ring 282. Ring 282 provides a mounting for an elongated balloon restraining tube 284 which is encircled by an attached tapered collar 286 which is of sufficient external diameter to snugly fit within ring 282. An air channel 288 extends the full length of tube 284 for conducting a stream of air in a manner to be explained. A pair of spring clips 290 are connected to ring 282 and are arranged to snap onto collar 286 and firmly seat it on its tapered diameter within said ring. Tube 284, preferably constructed of plastic or the like, is of such internal diameter as to closely surround a bobbin carrying a full supply of yarn in spaced concentric relationship. In this fashion tube 284 controls the ballooning of a bobbin while yarn is unwound therefrom. In the vertical direction, tube 284 projects upwardly from collar 286 and below the collar extending over the major length of the bobbin, but terminating at a level spaced slightly above the lower bobbin extreme and above arbor 220. As illustrated in FIGS. 18 and 19 the upper part of tube 284 projects somewhat above the bobbin and, at its uppermost section, is preferably flared for convenient entry of a full supply bobbin. It will be appreciated that the foregoing advantageous construction admits of ready removal of tube 284 and its attached collar 286 from ring 282 for the substitution of a tube of different diameter when the diameters of supply bobbins are changed. In this manner, the desirable tube may be utilized to accommodate the various diameters of supply bobbins. Further, it will be understood that tube 284 is oscillatable about a horizontal axis, the limit of clockwise motion as viewed in FIG. 19 being determined by a tab 292 connected to ring 282 adjacent bracket 276, which tab when in contact with said bracket 276 retains tube in a vertical plane. A spring 294 is attached at one of its ends to the lower edge of bracket 276 and the opposite end is connected to ring 282 for the purpose of biasing tube to its upright or vertical position.

Again viewing FIGS. 18 and 19, an upright support 296 is affixed on the outer diameter of ring 282. A cam follower 298 is attached at the upper end of this support, said cam follower terminating in the vertical plane of a cam 300 attached to the wall 34 of yarn servicing housing 30. Cam 300 is fashioned as a generally semi-circular member positioned to receive follower 298 and have it pass against the inside wall of the cam. The track of cam 300 is directed gradually inwardly off a theoretical circle concentric with shaft 60. It will thus be appreciated that as cam follower 298 engages with cam 300 and is urged therealong tube 284 will be gradually canted in a counterclockwise direction as viewed in FIG. 19.

For purposes of manipulating an exhausted bobbin core C into position for dislocation from its position on arbor 220 a finger or bobbin lifter 302 is provided adjacent the base of the active unwinding bobbin. Lifter 302 is supported on a slidable rod 304 loosely held in a horizontal position by a pair of brackets 306 and 308. A profile cam 310 is secured to rail 44 near the base of shaft 60. The lower extreme of rod 304 carries a follower 312 which is supported to ride along the edge of profile cam 310. Profile cam 310 has a single dwell lobe 313 the dwell of which is slightly in advance of the point at which cam 300 begins to tilt tube 284. It will thus be appreciated that, in operation of the foregoing elements for removal of a spent bobbin, as the shaft 60 is rotated to swing the parts attached thereto in a counterclockwise direction cam follower 312 is caused to travel along the profile of cam 310 thereby elevating rod 304 and causing lifter 302 to engage to lowermost end of the bobbin core C resting on arbor 220. Since the rise of the cam profile is greater than the length of arbor 220 the bobbin core C will be lifted completely off the arbor by lifter 302. At this point the cam follower 312 will ride on the dwell of cam 310 to effectively detain the bobbin in its raised position. With the bobbin core C in its fully elevated position follower 298 will have contacted cam track 300. Further rotation of shaft 60 thereupon causes follower 298 to be cammed inwardly due to the configuration of cam 300. This motion results in tube 284 rocking counterclockwise on posts 280 thereby sweeping the empty bobbin core away from alignment with arbor 220 as shown in FIG. 19 and permitting it to fall freely out of the tube. Further rotation of shaft 60 causes follower 312 to drop off lobe 313 whereupon finger 302 is reseated adjacent arbor 220. At the same time follower 298 rides off the end of cam 300 releasing tube 284 to rock back into its operative vertical position above arbor 220 under the bias of spring 294. It will be understood that while reference herein is made to the ejection of an empty bobbin core the lifting and ejecting mechanism will operate equally effectively to remove a bobbin having yarn wrapped thereon from arbor 220 if such removal is desired.

Bracket 274, affixed to shaft 60, has a further vertical arm 314. This further arm 314 extends outwardly from its connecting hub on shaft 60 generally diametrically opposite to the first arm 276. A post 315 is affixed to the outer end of arm 276. This post projects upwardly and supports on its uppermost end a cam roller 316 for actuating the bobbin pushing mechanism of magazine 80. To this end cam roller 316 is aligned for contact anvil 136 of magazine 80. Viewing FIG. 7 anvil 136 will be driven counterclockwise about its pivot point on stud 133 to thereby rock the previously described arm 119 and initiate movement of the reserve bobbins B.

A further camming member 318 in the form of a stiff, upright plate is also supported from one side of bracket 274 in a position spaced approximately diametrically opposite to roller 316. Member 318 terminates at its upward extreme at the vertical level of cam follower 152 extending outwardly from magazine 80. Therefore, it will be understood that, upon rotation of shaft 60 member 318 will engage with follower 152 to operate segment 146.

BOBBIN LOADING AND CENTERING MECHANISM

The arrangement by which a bobbin is transferred from its position in the chamber of the reserve bobbin supply magazine and on the inflatable arbor 220 will be described next. There is provided at one side of and below yarn servicing housing 30 a vertically disposed shaft 320 (see FIGS. 2 and 3) held in position at its lower end by a split collar 322 which is connected, in turn, to rail 44 by an angular brace 324 and secured at its uppermost part in a split mounting bracket or hub 326 attached to the side of the yarn servicing housing. Supported in a suitable bearing for rotation about shaft 320 and spaced somewhat below hub 326 is a flat plate or "shelf" 328 of generally ovate configuration. The position of shelf 328 on shaft 320 is established so that the broad section of the shelf will extend horizontally outward beneath the bottom opening or throat of chamber 94 to thereby generally enclose it. Shelf 328 thus serves to hold a bobbin from dropping out of chamber 94. An L-shaped latch 330 is fastened midway along the underneath side of shelf 328 with one leg thereof projecting downward. Latch 330 is thus arranged to be pushed or cammed by a roller 331 (FIG. 1) attached to the upper end of a rigid member 333 and lying in the plane of latch 330. In turn, member 333 is connected to one side of bracket 274. It follows that, during rotation of shaft 60, roller 331 will contact latch 330 and rotate it away from its position beneath chamber 94 in shutter-like fashion to permit a supply bobbin held therein to be released for free fall onto arbor 220 whereafter the shelf is returned to its position below chamber 94. Additionally a tension spring 332 has one of its ends pierced through the edge of shelf 328 and has its opposite end secured to a pin 334 embedded in a support arm 336. Spring 332 thereby provides a biasing force to yieldably hold shelf 328 interposed immediately below chamber 94. An adjustable stop 327 in the form of a screw threaded through hub 326 acts to engage with a laterally extending finger 329 of shelf 328 during its movement by spring 332. Thus, the shelf is stopped at the throat of chamber 94.

Support arm 336, just alluded to, is carried on the upper end of shaft 320, being anchored to the shaft between the bifurcated sections of split hub 326. The end of support arm 336 remote from its attachment point on shaft 320 is bored through to receive a further shaft 340. Said shaft 340 is fixed for rotation at its upper end on a bearing within support arm 336 and is retained against axial movement by a pair of collars 342 and 344 disposed on either side of and closely adjacent the support arm and firmly secured to shaft 340.

Figure 20:
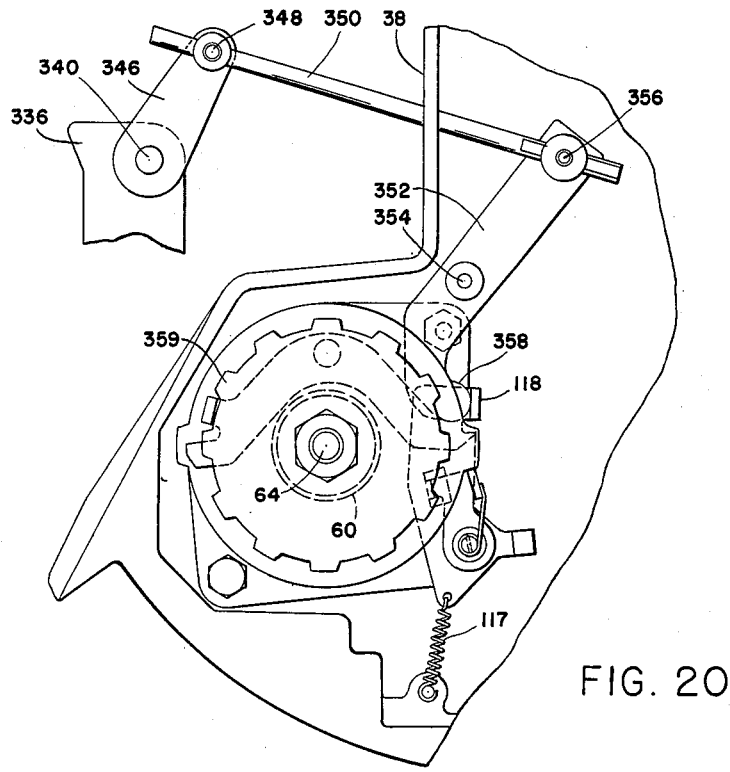
FIG. 20 is an enlarged detailed view, partly in section, of the clutching mechanism for indexing the yarn carrier.

Referring now to FIGS. 3 and 20 a rearwardly extending flat link 346 is connected to the upper end of shaft 340 at one of its ends. The other end of link 346 mounts on upstanding swivel post 348. A control rod 350 is retained at its outer end in the upper end of post 348, with its opposing inner end passing through an aperture in side wall 38 of yarn servicing housing 30. As seen in FIG. 20, within housing 30 an elongated lever 352 is mounted for pivotal movement at its approximate midsection on a stud 354. The rearward end of lever 352 supports an upstanding rotatable pin 356 which has an aperture through the upper end thereof to accommodate the inner end of control rod 350. The forward section of lever 352 is slightly curved and terminates in a foot 358 lying in a plane with and immediately behind an upstanding detent 118. At this juncture attention is once again directed to the previously cited patent application of Pitts and Steele wherein a clutching mechanism of the type suitable for use in conjunction with the present invention is fully disclosed. Said clutch mechanism is provided with means including a clutch plate 359 for rotating shaft 60 from internal shaft 64 thereby imparting translation to the yarn carrier through an arc of 180 degrees. Such motivation is used advantageously in the present invention to shift the yarn carrier between an active unwinding position or station where the supply bobbin may readily be unwound to furnish yarn to the winding spindle and a loading station where a fresh supply bobbin may be placed on the arbor of the yarn carrier. As a part of the clutch operation release of detent 118 is necessary to rotate the semi-revolution clutch through its 180° of revolution. It follows that this movement will be transmitted to the shaft 60, as reference to the cited application will show. In turn, the yarn carrier is likewise indexed through a path of 180°. Advantageously, the arrangement of parts just described provides means for releasing detent 118. This is achieved by rotating shaft 340 counterclockwise as seen in FIG. 20 thereby actuating the linkage through link 346, rod 350 and lever 352 to induce counterclockwise rotation to foot 358. Thereupon, foot 358 will push detent 118 to actuate clutch plate 359 and index shaft 60. A spring 117 is utilized to urge detent 118 into its inactive position as illustrated in FIG. 20. Since foot 358 bears on detent 118 it follows that, in consequence of the biasing force of spring 117 on the detent 118, foot 358 will likewise be swung to its inactive position by the spring. Shaft 340 and the linkage to foot 358 will also be biased by spring 117 to their inactive positions.

Figure 21:
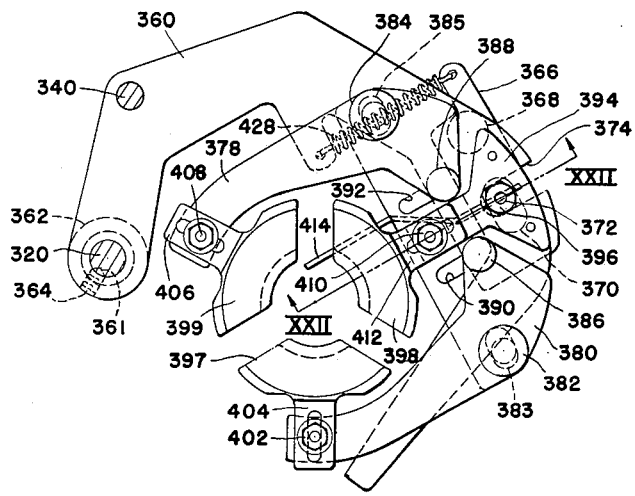
FIG. 21 is a detailed plan view in section illustrating the bobbin centering mechanism of the present invention.
Figure 22:
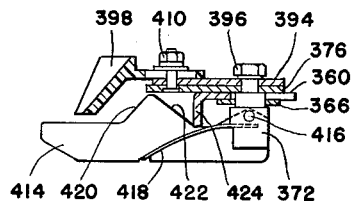
FIG. 22 is a view taken along lines XXII—XXII of FIG. 21.
Figure 23:
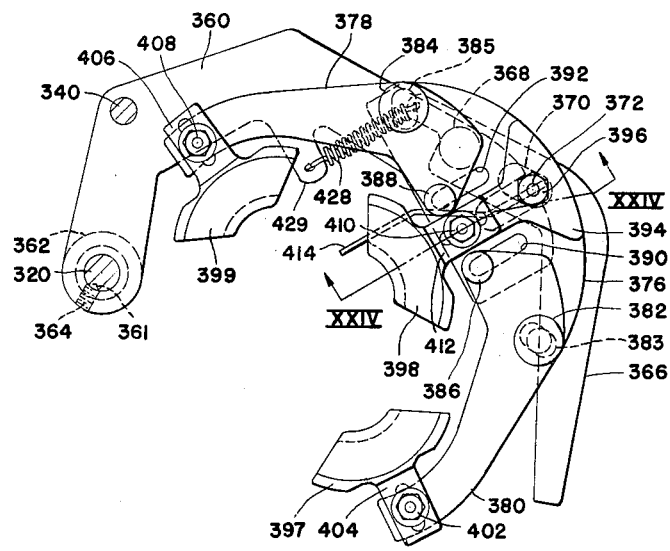
FIG. 23 is a view corresponding to FIG. 22 but shows the parts in a different position.

It has been stated that shelf 328 may be swung away from its position adjacent chamber 94 to release a fresh reserve supply bobbin supported on the shelf and within the chamber for transference to arbor 220. It is desirable during this transference that means be afforded to assist in locating the bobbin with its axial bore firmly on the arbor 220. To this end, and referring to FIGS. 21–24, a bobbin centering mechanism is provided which is operable in conjunction with the movement of the yarn carrier into position beneath chamber 94 and the dropping of bobbin down onto the arbor 220 in order to center it thereon. Thus, an essentially crescent-shaped member 360 is supported in a vertically oriented position on shafts 320 and 340 below magazine 80 and chamber 94. Further, member 360 lies in a plane generally intermediate the lower end of tube 284 and the top of arbor 220 (see FIGS. 2 and 3). A collar 362 affixed to member 360 and held on shaft 320 by set screw 364 constrains member 360 in a fixed vertical and horizontal plane on the shaft. Preferably, shaft 320 has a longitudinal V-shaped keyway 361 into which set screw 364 is seated thereby providing for vertical adjustment of member 360. In this fashion the member 360 will maintain a constant angular relationship to shaft 320 as it is vertically adjusted. The particular angle at which member 360 projects from shaft 320 is fixed so that said member 360 will lay on a portion of an imaginary circle concentric about a theoretical extension of the axis of chamber 94. Member 360 is the central frame about which the several components of the centering mechanism are oriented. An operating arm 366 is connected for swinging movement to the outer end of member 360 by a stud 368. Arm 366 is bent to generally a right angle so that from its connecting point on member 360 it lays directly beneath said member for some distance passing out from therebeneath at its approximate midpoint and diverging gradually outward in essentially a straight line. Intermediate its run beneath member 360 operating arm 366 has an oblong slot 370 through which is passed a post 372, this post projecting downwardly below member 360 and having its lowermost section bifurcated. In order that post 372 may be accommodated for lateral movement a transverse passage 374 is provided, this passage extending partly through the side of member 360. A semi-circular plate 376 is positioned in overlying relationship on member 360 toward the outer end thereof and, in fact, projects somewhat beyond the outer end of the member. A pair of arms 378 and 380 are rotatably supported on diametrical ends of plate 376 by flat-headed rivets 382 and 384 respectively which pierce through elongated slots 383 and 385, respectively, the arms near the terminal ends of plate 376. Each of the arms 378 and 380 extend beyond the limits of plate 376. As best seen in FIGS. 21 and 23 each of these arms is curved forwardly, the arm 380 generally overlying a portion of member 360. Further, arm 378 follows approximately the curvature of member 360, this arm being coterminous with the forward end with its companion arm 380. It will be observed that the innermost ends of arms 378 and 380 are held by opposing broad-headed rivets 388 and 386 respectively. Each of these rivets passes downward loosely through suitable slots 390 and 392, each slot lying on an opposite side of the axis of symmetry of plate 376. Intermediate the slots 390 and 392 and lying on the axis of symmetry of plate 376 is a further plate 394 of generally T-shape held in position by post 372 which passes therethrough and a nut or collar 396 threaded to the top of the post.

The centering mechanism includes a trio of segments 397, 398 and 399 arranged in spaced relationship about a common concentric circle each segment being adapted for radial movement with respect to a common center. Each of the segments is dished or concave and arcuate along its greater dimension to present a contoured surface corresponding generally to the lower tapered periphery of a yarn supply bobbin wound in accordance with the practice well known in the textile art. As seen in FIG. 2 the lower end of each of the segments is disposed in close proximity to the top of inflatable arbor 220. Segment 397 is connected onto the outer terminal end of arm 380 by a screw 402 entered through an elongated slot in a shank portion 404 thereof which affords adjustment of the segment relative to the arm. In like manner and for the same purpose segment 399 is supported on a shank 406 and retained by a screw 408. Additionally, segment 398 is attached on the axis of symmetry of plate 376 by a screw 410 passing through its shank 412.

Figure 24:
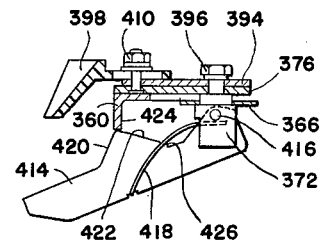
FIG. 24 is a view taken along lines XXIV—XXIV of FIG. 23.
Figure 25:
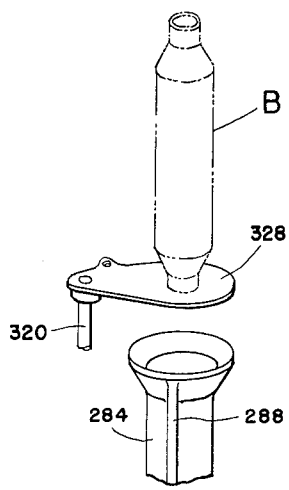
FIGS. 25 through 29 are schematic perspective views showing in sequence the position of the reserve bobbin as it gravitates onto the inflatable arbor.

It has been related previously that the lower section of post 372 is bifurcated. Disposed in the kerf between the bifurcated branches is a trigger 414 which projects forward horizontally and terminates generally in the vertical plane of the axis of segments 397 and 399 (FIGS. 22 and 24). Trigger 414 acts to release the segments from their grip on the fresh supply bobbin once it is positioned on arbor 220. Advantageously, trigger 414 is slightly offset in its forward run so that its outer end lies somewhat closer to segment 399 than to the remaining segments. By the offset arrangement trigger 414 is not fired by the lowermost end of the bobbin but, rather, is contacted by a section of the bobbin upwardly from the bobbin butt. Thus, the trigger is not fired until the bobbin is firmly on arbor 220. Trigger 414 is pivotally supported on a pin 416 and biased upwardly by spring 418. As seen in FIGS. 22 and 24 trigger 414 is provided with an upwardly disposed projection 420 having a gradually inclined cam edge 422. In alignment with projection 420 there is a fixed tab 424 which is bent down from the forward edge of member 360 and positioned to engage with and ride up the incline of cam edge 422 thereby depressing trigger 414 against the biasing force of spring 418. A shoulder 426 is provided at the base of cam edge 422 into which trigger 414 is normally urged by spring 418 thereby yieldably restraining the trigger from contact with edge 422.

In order that the segments 397, 398 and 399 may be swung open simultaneously as shown in FIG. 23 when released from trigger 414 a relatively heavy tension spring 428 is anchored at one of its ends to the lower end of rivet 384. The opposite end of spring 428 is connected to a projecting ear 429 extending inwardly from one side of number 360. When the segments are drawn closed (FIG. 21) spring 428 is tensioned. In consequence thereof, firing of trigger 414 permits the spring to pull arm 366 counterclockwise (FIG. 23) and open the segments.

In operation, segments 397, 398 and 399 will normally be held in the closed or loaded position as illustrated in FIG. 21 by the engagement of tab 424 with shoulder 426. However, when trigger 414 is biased downwardly or fired, as when it is so moved by a bobbin, tab 424 is released from the shoulder 426. Immediately spring 428 rotates operating arm 366 as just described about stud 368 (see FIGS. 21 and 23). This motion causes plate 376, which is linked with arm 366 through post 372, to snap rearwardly (see FIG. 23) with post 372 travelling the full length of slot 370. As plate 376 is shifted rearwardly segment 398 and plate 384, both of which are affixed to plate 394 by screw 410 are carried rearwardly therewith. At the same time, rivets 386 and 388 which control the movement of arms 378 and 380, respectively are shifted from their positions at the front of their respective slots 390 and 392. This causes each of these arms to be cammed or shifted radially outward from their position as shown in FIG. 21 to the position as illustrated in FIG. 23. Each of the slots 383 and 385 serve as guides while permitting each of the arms 378 and 380 to swing clear of a bobbin which has been positioned on arbor 220.

To recock the centering mechanism it is necessary to move operating arm 366 clockwise (see FIGS. 21 and 23). This motion urges plate 376 and segment 398 forwardly. By the same forward motion of plate 376 rivets 386 and 388 shift to the rear of slots 390 and 392, respectively, thus swinging segments 397 and 399 inwardly to the position of FIG. 21. Post 372 and trigger 414 are advanced in conjunction wit hthe forward movement of plate 376. Tab 424 is biased down cam edge 422 and engages with shoulder 426 to hold to centering mechanism in its loaded position until released once again by downward pressure on trigger 414.

A cam roller 430 is supported on a lateral ear-like extension 431 of bracket 274. Follower 430 lies at the same vertical level as arm 380 and serves to recock the centering mechanism by bearing against operating arm 366 in response to rotation of shaft 60 subsequent to each firing of the centering device.

Provision is made in the present invention for utilizing the rearward motion of arm 378 in order to restart the cycling of shaft 60 and the components carried thereby. To this end the lower end of shaft 340 has a bell crank 432 affixed thereto as shown in FIG. 4. The end of bell crank 432 has a post 433, this post being positioned vertically to intersect the path of movement of arm 378 (see FIGS. 2, 3 and 4). As earlier related the upper end of shaft 340 is operatively linked with clutch 359. By this advantageous arrangement of parts rearward movement of arm 378, i.e., clockwise movement as viewed in FIGS. 22 and 24, will bring the arm in contact with post 433. In turn, post 433 will be driven thereby to rock shaft 340. Thereupon, detent 118 of clutch 359 is shifted through the action foot 358 to free the clutch for 180° of revolution.

MAIN AIR CONTROL SYSTEM

Figure 5:
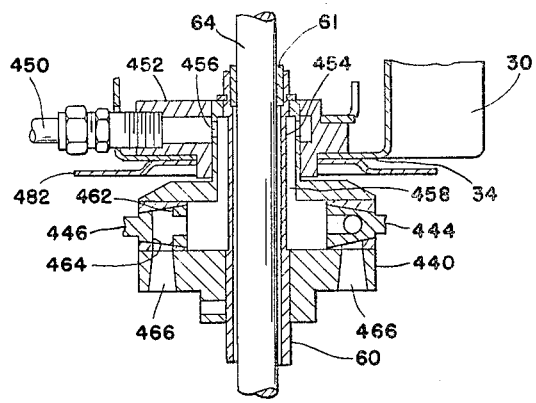
FIG. 5 is an enlarged fragmentary section taken along lines V—V of FIG. 4.

As best seen in FIGS. 4 and 5 a rotary air valve housing 440 is keyed to the upper end of shaft 60 for rotation therewith. Air valve housing 440 is provided with a plurality of air valves here shown as four in number and designated as 442, 444, 446 and 448. Each valve is tapered and is supported for rotation in a seat within housing 440 having a mating taper. Air is introduced to the tapered valves from an external source (not shown) through an air pipe 450 which extends the full length of the machine for supplying a plurality of units. The air enters the unit through an annular non-rotatable chamber 452 which surrounds a neck 454, a suitable air tight seal being interposed to contain the air passing between said chamber and neck. Neck 454 is integral with air valve housing 440 and projects upwardly therefrom encompassing the uppermost section of hollow shaft 60. The neck 454 is bored through to provide ports, one of which is seen at 456 at several points around its circumference in its section embraced within chamber 452. It will be appreciated that neck 454 will rotate cooperatively with housing 440, while chamber 452 will remain stationary with respect thereto. Thus, the air is passed through ports 456 and down through the channel 458 between and into valve housing 440. Within the air valve housing 440 the supply of air is received in suitable air passages not herein illustrated where it is conducted to the tapered valves 442, 444, 446 and 448. Each of these valves is provided with an axial passage which communicates with a transverse hole extending across the valve thereby providing a pair of diametric apertures 462 and 464 through the side of each valve. In turn, each tapered valve seat is bored through at its bottom to provide a single outlet 466 aligned to communicate with an aperture 462 or 464 when either aperture of any particular valve is rotated thereto, the distal end of each outlet 466 opening through the bottom of air valve housing 440.

The outer end of each of the valves 442, 444, 446 and 448 is formed as a stem 468 which projects radially from the side of air valve housing 440 for some distance. A series of star wheels designated 470, 472, 474 and 476 respectively a refixed to the stem of each valve, each star wheel having four equidistant, radial fingers at the outer end thereof. By virtue of this arrangement each valve may be conveniently rotated by rotating its respective star wheel. During such rotation apertures 462 and 464 will be, from time to time, presented in alignment with their corresponding opening 466. With either aperture aligned with outlet 466 air will pass therethrough and further rotation of the valves on the order of 90 degrees will rotate the apertures completely away from alignment with the opening and prevent the passage of air.

Situated upwardly of air valve housing 440 and fixed to horizontal front portion 34 of yarn servicing housing 30 is a flat, circular and non-rotatable plate 482. Said plate 482 is provided with a series of elongated curvilinear slots, each of which defines a path concentric with the axis of shaft 60. As seen in FIG. 4 the slots are arranged in four pairs, each pair lying on a separate concentric circle on the plate. Viewing FIG. 4 it will be seen that each of the outermost pair of slots 484a and 484b, which are located aproximately diametrically disposed on plate 482 to each other, are provided with an independently movable screw or "trip dog" 486a and 486b respectively. The trip dogs project from the bottom of the slots and are secured in place by means such as mating nuts so that each of the trip dogs may be slidably moved to a desired location within the slot. It will be observed in FIG. 4 that the trip dogs 486a and 486b are aligned with star wheel 470 of valve 442 and actually depend into the horizontal plane of said star wheel 470 terminating slightly above stem 468. Thus, as air motor housing 440 is rotated cooperatively with shaft 60, to which it is affixed, trip dogs 486a and 486b will alternately strike star wheel 470. Each instance of contact between star wheel 470 and either one of the trip dogs 486a or 486b will index air valve 442 approximately 90 degrees. It follows that every other index of air valve 442 will present an aperture 462 or 464, which are 180° apart, in alignment with outlet 466 to turn the air valve "on" and permit passage of air while the intervening indexes or turns of the air valve will shift both apertures away from alignment with outlet 466, into a horizontal or "off" position, so that passage of air is effectively arrested.

A suitable fitting 488 is affixed in air block housing 440 at the output side of valve 442. Fitting 488 receives one end of a flexible air hose 490 in air tight relationship. The opposite end of hose 490 is affixed in air tight relationship to main air intake port 228 in valve block 202. Air hose 490 thereby serves to conduct pressurized air into block 202 for driving air motor 200.

Reverting now to FIG. 4, there are three additional pairs of curvilinear slots in plate 482, the separate slots of each pair being at variously spaced distances one from the other and each pair lying in a separate concentric circle from the other pairs. Thus, slots 492a and 492b lie on a circle slightly inwardly from slots 484a and 484b. In a fashion similar to that described with the previous slots of plate 482, slot 492a has a trip dog 494a affixed therein and slot 492b supports a trip dog 494b. Trip dogs 494a and 494b depend below plate 482 sufficiently to engage with and rotate star wheel 474 on valve 446. An air-tight fitting 496 secures one end of an air hose 498 to housing 440 at the discharge side of valve 446 (FIGS. 2 and 3). The distal end of hose 498 is attached to a movable cylinder 500. Cylinder 500, in turn, is suitably supported to pivot on a bracket 502 extending outwardly from shaft 60. A tube which will be referred to as a "down jet" 504 projects outwardly from one end of cylinder 500 terminating closely adjacent tube 284 and arranged to direct a stream of air in the region of the lower end of a bobbin. The mounting of cylinder 500 on a pivot affords a convenient adjusting means for directing the air flow of down jet 504 in a desirable direction with respect to the bobbin B'.

A third pair of slots 506a and 506b are formed in plate 482 and, in like manner as with the previously described slots, support slot 506a receives a trip dog 508a and slot 506b has a trip dog 508b located therein. Each of the trip dogs 508a and 508b depend into the plane of star wheel 476 of valve 448 for contact therewith. It follows, as with the previously described trip dogs, that as shaft 60 is driven to rotate housing 440 trip dogs 508a and 508b will strike and turn star wheel 476 to turn valve 448. This results in its apertures 462 and 464 being aligned with its outlet 466 to pass air therethrough upon each 180° of rotation.

The output side of valve 448 opens into a fitting 510 having an air tube here denominated as "tip jet" 512, affixed thereto (FIGS. 2 and 3). Tip jet 512 is positioned to direct a stream of air onto the upper windings of the bobbin B' in order to maintain these windings in position against the upward pressure from sources to be described next. As will be seen it is desirable in the operation of the present invention that the uppermost windings on the supply bobbin be prevented from sloughing off and this objective is attained by tip jet 512.

The innermost pair of slots 514a and 514b in plate 482 accommodate trip dogs 516a and 516b respectively. Viewing FIG. 4 it will be seen that trip dogs 516a and 516b are positioned to engage and rotate star wheel 472 fixed on the outer end of valve 444. In like manner as with the valves of valve housing 440 valve 444 is operated by dogs 516a and 516b. The output side of valve 444 in housing 440 is equipped with a T-shaped fitting 518. One side of the fitting 518 receives a pipe or "auxiliary up-jet" 520, the outer terminal end of which is disposed in channel 288 of tube 284 and serves to provide a source of air therein. Conveniently, a shut-off valve 522 is interposed between the output end of auxiliary up-jet 520 and its input at fitting 518 so that this jet can be rendered inoperative. In practice, it has been found that auxiliary up-jet 520 is necessary only when manipulating heavier denier yarns off the supply bobbin B. Thus, it is advantageous to the economical operation of this invention that the auxiliary up-jet be secured when the air supply therefrom is not required.

With further reference now to T-shaped fitting 518 the end thereof opposite from that connected to auxiliary up-jet 520 has a flexible air hose 524 fitted thereto in air tight relationship. Air hose 524 passes down around shaft 60 and is secured at its lower end in a pivoted cylinder 526. The output side of cylinder 526 has one end of a tube, herein referred to as an up-jet 528, connect thereto. The distal end up-jet 528 is disposed in an upwardly projecting position beneath the lower end of tube 284 and in close proximity to arbor 220. The pivoted cylinder 526 serves as a convenient mounting to permit adjustment of up-jet 528 so that it can direct a current of air longitudinally upward along a bobbin supported on arbor 220, the air most desirably being restricted or confined between the bobbin and channel 288 of tube 284.

A further jet 530, which may appropriately be called a "cross-jet," is connected in an air-tight seal into a suitable bore 532 opening to valve 254. The opposite end of cross-jet 530 is situated slightly upward from the plane of cutter wheels 263, 264 and 265 and is oriented to direct a stream of air across these cutter wheels, the air supply thereto being provided by the air exhausted from air motor 200. It will be appreciated that lint, yarn cuttings and other waste will be swept away from zone of the cutter wheels as air is expelled through cross-jet 530 assisted by air from down-jet 504.

WASTE COLLECTING MEANS

Means are provided in the present invention for serving in cooperative fashion with cross-jet 530 to collect waste materials blown from the zone of the cutter wheels and for carrying these waste materials away. To this end a generally rectangular compartment or duct 540 is mounted uprightly on a rigid neck 544 pierced through extension 542 of rail 44, FIGS. 1 and 2. Neck 544 provides a connection between a suitable suction source and duct 540. Viewing FIGS. 13–15 it will be seen that an inner longitudinal wall 546 of duct 540 is slightly beveled in cross section to present a rather broad wall facing inwardly toward shaft 60. Wall 546 has a rather wide lengthwise opening or slot 548 therein. A hinged door 550 provides a closure for slot 548, the door being spring biased at 552 to urge it in a closed position covering the slot. The lower end of door 550 has a laterally projecting arm 554 attached thereto, the outer end of which supports a cam follower 556. A radial disc cam 558 is fixed to the lower end of shaft 60 for rotation therewith. During revolution of shaft 60 cam 558 is moved therewith. The profile of cam 558 contacts follower 556 and swings door 550 open thereby permitting suction duct 540 to draw in waste materials. As will be more fully related hereafter, this action is timed to coincide with the operation of air motor 200 so that air is discharged through cross-jet 530. Advantageously, a baffle plate 560 is positioned uprightly adjacent slot 548 to direct waste blown by cross jet 530 into duct 540.

YARN END GUIDING AND HOLDING MEANS

Once the yarn end of a fresh supply has been manipulated off the body of the bobbin and directed toward the winding section it is desirable that means be provided to guide its movement to a holding means where it is received and subsequently transferred to be joined with the trailing yarn end of the take-up package. As seen in FIG. 1 a generally cone-shaped air deflecting bonnet 570 extends forwardly from yarn servicing housing 30 and encloses the region upwardly of the bobbin containing tube 284. Bonnet 570 is preferably supported on a pintle 572 or the like so that it can be swung away from housing 30 to afford easy access thereto. As best seen in FIG. 6 the rearward section of bonnet 570 tapers into somewhat of a V-shaped configuration in section to present a funnel-like opening 574 from the bonnet toward a suction aperture 576. Suction aperture 576 is located approximately midway along the top panel of housing 30 toward one side thereof and is in communication with vacuum chamber 183, previously referred to. A semi-circular hood or receptacle 578, closed at one of its ends, is mounted in inverted position on the panel 42 and encloses the zone above aperture 576. The open end or mouth 580 or receptacle 578 is aligned with the funnel opening of section 574 in bonnet 570. It will be appreciated that, by virtue of the cooperative arrangement of bonnet 570 with aperture 576, yarn which is blown from the supply bobbin B upwardly into the bonnet will be deflected with its conveying stream of air into the V-shaped section 574. At this point the yarn will be received in receptacle 578 and drawn into aperture 576 by the suction. So positioned the yarn may be retrieved readily by suction tube 155 in the manner described in U.S. Patent 2,764,362.

In the interests of economy of operation, the present invention incorporates means for controlling the suction to aperture 576. As best seen in FIGS. 6 and 30 aperture 576 communicates with an opening 590 through the front wall of vacuum chamber 183 by means of a connecting tube 586. The attachment end of tube 586 is formed as a larger generally square box-like section 588 which serves to surround and enclose the vacuum chamber opening 590. A slidable plate-like shutter 592 serves to cover opening 590. This shutter is connected to one end of an offset, operating link 594 rockable about a pivot 595 (see FIG. 30), the other end of the link being provided with a cam follower 596. As seen in FIG. 30 section 588 of tube 586 is provided with a suitable clearance slot in the upper wall thereof to allow for withdrawal of shutter 592 from its covering position over opening 590 during upward rocking movemnet of the end of link 594 connected thereto.

Turning again to FIG. 30 it is seen that bracket 274 which is affixed for rotation to shaft 60 and which supports tube 284 and its related components, has a second laterally extending wing 598 projecting generally diametrically away from tube 284. A cam member 600 having two independent camming profiles or surfaces is connected to the wing 598, the cam profiles lying in the plane of movement of follower 596 for operation thereof. Thus, a camming surface 602 of said member 600 inclines downward and rearwardly so that, as it is rotated in a counterclockwise direction as seen in FIG. 30 into contact with follower 596, it will cause link 594 to rock counterclockwise about pivot 595 to elevate or retract shutter 592 from opening 590 so that suction duct 183 will be operatively joined with aperture 576. As viewed in FIG. 30 a second camming surface 604 is located on the lefthand or trailing end of member 600 so that it will contact follower 596 after surface 602 when shaft 60 is rotated counterclockwise. Camming surface 604 inclines upwardly from its front or leading edge to its trailing edge to engage follower 596, after the follower has been depressed by camming surface 602, and elevate it. Hence, camming surface 604 serves to rock link 594 clockwise about pivot 595 to close shutter 592 over opening 590. A guide portion 606 of mmeber 600 is folded over directly above surface 604 and acts to limit the upward flight of follower 596 in the event the follower tends to leave surface 604 in its upward travel.

OVERALL OPERATION

With the apparatus of the present invention in its active unwinding position inflatable arbor 220 and its related components will be set in a forward position, i.e., disposed forwardly of the vertical plane of the front wall 40 of yarn servicing housing 30 as depicted in FIG. 3. Yarn being supplied by the supply bobbin B' will be threaded across the top panel of yarn servicing housing 30 and, in the course thereof,, will be guided through tension device 70 waxing attachment 75 and slub catcher 95, thereafter passing over breaker lever 625, the tension in the winding yarn strand serving to hold the breakage lever depressed and inoperative. It will be noted that, at this time, air valve 442 will be in its "on" position admitting air through hose 490 into valve block 202. The air thus admitted is contained in the block due to the fact that exhaust valve 230 is closed. In consequence, diaphragm 218 of inflatable arbor 220, responding to this air pressure, is distended through chordal slots 224 to firmly grip the supply bobbin B'. Due to the fact that cavity 204 is also charged with pressurized air flowing into valve block 202 through hose 490 the vanes 206 are impeded from rotating. In consequence thereof arbor 220 is secured in a fixed non-rotatable position during the unwinding cycle.

Upon the exhaustion of the yarn being withdrawn from bobbin B', or where the strand being withdrawn from bobbin B' is interrupted as by breaking, instrumentalities are brought into operation for initiating the end finding and tying cycle as described in the previously cited U.S. patent and application. Briefly in response to either of the conditions just mentioned strand tension necessarily fails and breakage lever 625 is thereupon released from its depressed position to rock upwardly. In the course of this end finding cycle suction nozzle 155 swings forwardly and downward to retrieve an end of yarn from the supply package and conveys it to end reuniting means not illustrated herein.

In addition to initiating of the end finding cycle and simultaneously therewith a supply package indexing cycle is commenced to provide a new supply bobbin and present its leading end for introduction to the end-finding and uniting means. As fully related in the aforementioned patent application the upward movement of breakage lever when released from its influence under a yarn strand actuates instrumentalities which cause rotation of shaft 60. As incidents of the rotation of that shaft numerous operations take place.

These operations include:

(a) Purging air motor 200.
(b) Ejecting core C from inflatable arbor 220.
(c) Loading a fresh supply bobbin on inflatable arbor 220.
(d) Operating air motor 200 and inflatable arbor 220.
(e) Operating down-jet 504.
(f) Operating tip-jet 512.
(g) Actuating the suction system to aperture 576.
(h) Operating up-jet 528 and, if desired, auxiliary up-jet 520.
(i) Actuate magazine 80 to prepare a new bobbin for transference to inflatable arbor 220.
(j) Recocking the bobbin centering mechanism.

(a) Purging air motor 200

Figure 31:
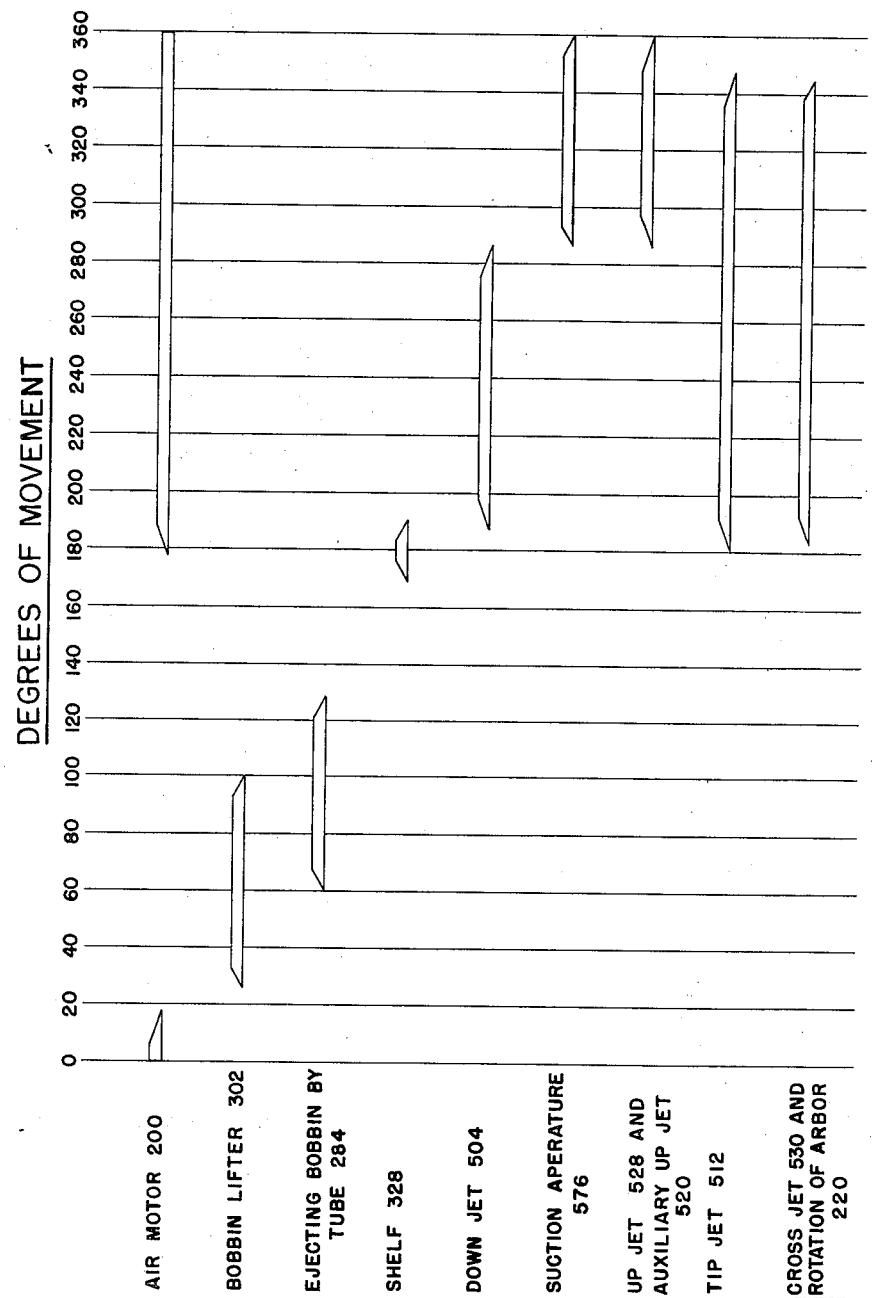
FIG. 31 is a time chart showing the time relationship of various operations of the present invention.

With attention now to the chart of FIG. 31, the starting point therein (i.e., 0°) is taken as the position of the yarn carrier with arbor 220 set in the active unwinding position. It will be noted in FIG. 31 that during the unwinding of bobbin B' air motor is on by virtue of valve 442 being open to admit air into valve block 202. At the same time exhaust valve 254 is closed. The presence of pressurized air in the valve block acts to secure the air vanes 206 against rotation, thus holding the inflatable arbor 220 and bobbin B' in a fixed, non-rotatable position. Further, the air within valve block 202 is conducted to the inflatable arbor 220 to distend it so that it may engage and hold bobbin B'.

In the first part of the movement of shaft 60 to translate the yarn carrier and its related parts from the active unwinding position as shown in FIGS. 1, 3 and 4 to the loading position as illustrated in FIG. 2 star wheel 442 is rotated 90° to shut off the air supply to air motor 200. As depicted by the bar adjacent "Air Motor 200" in the chart of FIG. 31 this action is completed after about 18° of rotation from the active unwinding position. Concurrently with the arresting of air to the air motor 200, exhaust valve 254 in valve block 226 is tripped open by the contact of trip dog 257 with star wheel 258 during the rotation of shaft 60. At this time inflatable arbor 220, which has been under a condition of pressure and bearing on the internal diameter of the bobbin core C, will deflate as the air therein is vented. Thus, the core C of bobbin B' will rest loosely on arbor 220.

(b) Ejecting core C from arbor 220

With further reference to FIG. 31, and as is charted therein, after approximately 25° of rotation from the unwinding position bobbin lifter 302 is actuated. This action occurs as cam follower 312 engages on the periphery of cam 310 to commence upward movement of core lifter 302. Lifter 302 gradually raises the core C axially upwardly off inflatable arbor 220, holding it above and aligned with the arbor momentarily in response to follower 312 riding along dwell lobe 313.

While core C is held upwardly off arbor 220, the balloon restraining plastic tube 284 is rocked by communication of cam follower 298 with cam 300 to swing the bottom of the tube outwardly and away from axial alignment with inflatable arbor 220. This swinging motion commences after about 60° of rotation of the yarn carrier (FIG. 31). This motion carries the empty core C, which is contained within tube 284, outwardly releasing it from the grip of lifter 302 and allowing it to fall freely away from the tube as illustrated in FIG. 19. As observed in FIG. 31 the ejection cycle for the core C is complete after approximately 130 degrees of rotation of shaft 60, the last step in this cycle being for follower 298 to ride off the end of cam 300. Spring 294 acts to pull tube back into coaxial alignment with arbor 220, tab 292 acting as a locating member and as a stop during the return of tube 284 by the spring. During the interval while core C is being displaced by tube 284, or after about 100° of rotation of shaft 60, cam follower 312 rides off lobe 313 of cam 310 to reestablish lifter in its inactive position adjacent inflatable arbor 220.

(c) Loading a fresh supply bobbin on arbor 220

Figure 26:
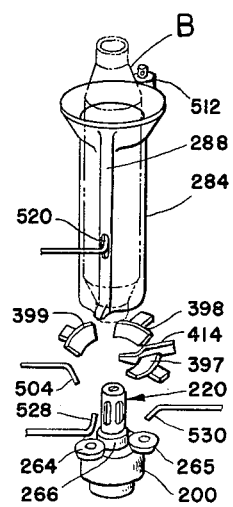
Figure 27:
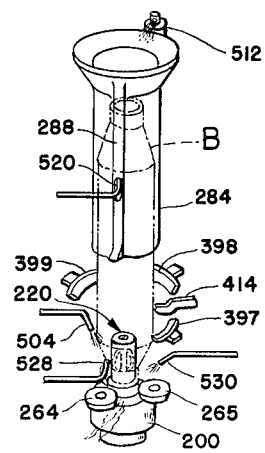

Just prior to the completion of the core ejecting cycle the movements to effect the loading of a fresh supply bobbin from the magazine 80 onto inflatable arbor are commenced. Thus, after about 170° of rotation of shaft 60 roller 331 engages with latch 330 depending from the lower side of shelf 328. In consequence thereof shelf 328, having a fresh bobbin, sitting uprightly thereon, begins to swing away from chamber 94, rotating clockwise as viewed in FIGS. 4 and 26.

Coincident with the arrival of inflatable arbor 220 in its loading position (see FIG. 2), shelf 328 is retracted completely out of alignment with the throat of chamber 94 thereby permitting a fresh bobbin previously held on shelf 328 to gravitate into tube 284 and onto arbor 220. Such action takes place at the point when shaft 60 has rotated generally 180° from the active unwinding position of inflatable arbor 220. At this time further rotation of shaft 60 is momentarily halted by virtue of the operation of semi-revolution clutch 359.

Figure 14:
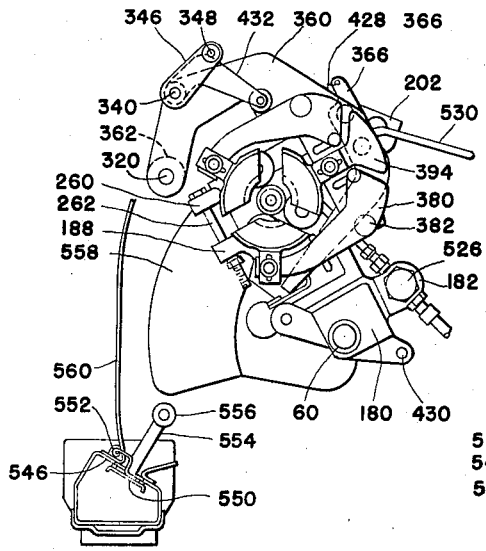
FIGS. 14 and 15 are views similar to FIG. 13 but illustrating the parts in different positions.
Figure 15:
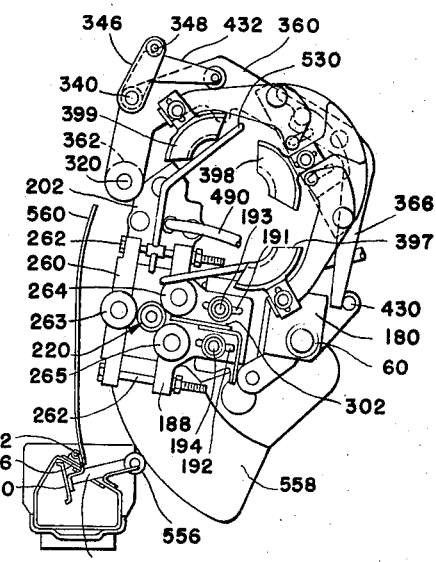

As inflatable arbor 220 arrives at its loading position it will be disposed somewhat below and in axial alignment with the center of a theoretical circle circumscribed by segments 397, 398 and 399 of the bobbin centering mechanism as seen in FIG. 14. As will subsequently be related the centering mechanism is "loaded," i.e., the segments are drawn inwardly toward a common center preparatory to receiving the lower section of the fresh bobbin, see FIGS. 14, 22 and 24. In the process of gravitation of bobbin B downwardly through the throat of chamber 94 it enters tube 284 continuing downwardly over hood 222 and inflatable arbor 220. Segments 397, 398 and 399 receive the lower end of the bobbin on its taper and aid in guiding it on arbor 220. As the bobbin slides downward over the inflatable arbor, trigger 414 is struck by the tapered lower side of the bobbin and depressed. This movement releases tab 424 from shoulder 426, whereupon the tab is biased up cam edge 422 by spring 428 and the segments snap open as shown in FIGS. 15 and 24. At this time arm 378 will strike post 433 to reinitiate the indexing of shaft 60 through a further 180° of revolution. Cutter wheels 263, 264 and 265 or, alternatively, sleeve 266 acts as a stop to limit the downward movement of the fresh bobbin on arbor 220, the bobbin resting either on the top of and in contact with these cutter wheels until lifted therefrom by lifter 302 during the core ejection cycle. If the internal diameter is sufficiently small the bobbin will come to rest on sleeve 266. It will be appreciated that the vertical disposition of the bobbin, in either event, is approximately the same due to the fact that the top of the cutter wheels and the upper circumference lie approximately in the same vertical plane.

(d) Operating air motor 200 and inflatable arbor 220

As shaft 60 commences its further uninterrupted 180° of rotation to position the fresh supply bobbin in its active unwinding position various steps take place for the purpose of drawing the leading end of yarn off the fresh bobbin and uniting it with the trailing end of the take up package. As a first step in this procedure star wheel 470 is rotated into contact with trip dog 486a affixed in the stationary plate 482. This contact acts to rotate the star wheel 90° aligning one of the apertures 462 or 464 with its air outlet so that pressurized air will flow through hose 490 into valve block 202. It will serve at this point to recall that exhaust valve 254 in valve block 202 was opened as an initial step in the bobbin core ejection cycle. Thus, air entering valve block 202 will flow through cavity 204 and outwardly through the exhaust valve 254. In consequence thereof, vanes 206 are driven to rotate arbor 220. Further, air from valve block 202 is conducted into the arbor 220 thereby expanding it through the slots 224 of hood 222 and causing it to seize on the core of bobbin B'. In this manner bobbin B' is rotated on arbor 220. Advantageously, the air which is exhausted through valve 254 is conveyed by cross-jet 530 directionally toward the lower end of bobbin B' and cutter wheels 263, 264 and 265 to remove impurities therefrom. As is graphically illustrated in FIG. 31 the air to motor 200 is turned on promptly after shaft 60 commences its rotation from its 180° position at the bobbin loading position. In accordance with the present invention satisfactory results have been achieved when the air motor is rotated between 1000 r.p.m. and 9000 r.p.m., proportionately higher speeds in this range being of advantage with yarns of increasing high count.

Earlier discusion in connection with the construction of valve block 202 and its related valves has set forth the manner by which the rotational direction of arbor 220 may be controlled. This feature is of advantage in facilitating removal of the end of the bobbin in the following manner. If a bobbin of yarn to be used as a supply source has been previously wound on a spindle which was rotated clockwise, it follows that the coils of yarn will be wrapped counterclockwise thereon if viewed in top plan. Desirably, in practice with a bobbin so wound air motor 200 should be set to rotate arbor 220 in a counterclockwise direction. This will induce the loose trailing outer end of yarn to pull away from the body of the bobbin in response to centrifugal force whereupon it may be readily manipulated for subsequent operations.

Of course, if the supply bobbin is of the opposite wind to that described above, i.e., if the coils of yarn are wrapped on the bobbin in a clockwise direction, the arbor 220 would advantageously be rotated in a clockwise direction to take advantage of the resultant forces tending to urge the yarn end away from the body of the bobbin.

(e) *Operating down-jet 504*

Figure 28:
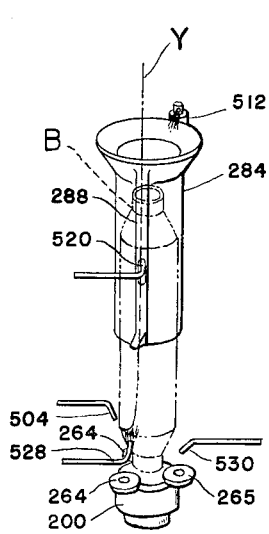
Figure 29:
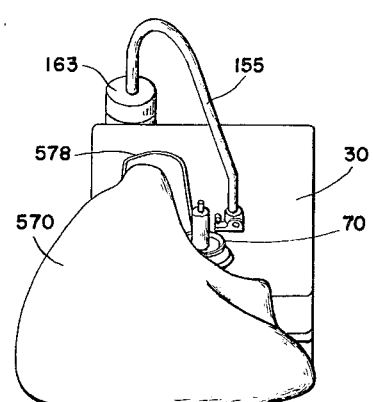
Figure 29:
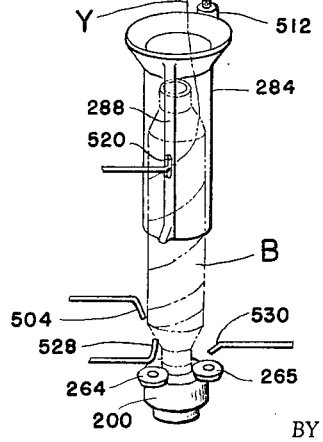

With bobbin B' being rotated on arbor 220 as just described, the next step in the end-finding cycle is achieved as down-jet 504 is turned on to provide air against the lower end of bobbin B'. This commences shortly after the bobbin rotation step is commenced, as seen by the chart in FIG. 32. Desirably, this air is directed to flow downwardly and along the lower wraps of the bobbin, particularly engaging the loose, trailing outer end which has pulled away from the body of the bobbin and resulting in peeling off or unwinding of this loose end and the connected yarn wraps, see FIG. 28. If the lower wraps terminating in the trailing end taper inwardly toward the bobbin core this air stream will be directed to follow therealong, inclined to the axis of the bobbin. The operation of down-jet 504 is accomplished as star wheel 474 of valve 446 is rotated by contact with trip dog 494a.

It will be recalled that bobbin B' is resting in proximate contact with rotatable cutter wheels 263, 264 and 265. Consequently, as bobbin B' is rotated the cutter wheels will also rotate from the frictional contact with sleeve 266 of arbor 220. Thus, as the wraps of yarn are blown downward off the bobbin they are engaged by the cutter wheels and, hence, severed. The clipped ends produced thereby are blown away by cross-jet 530 and down-jet 504. It follows that, when down-jet 504 is turned off by star wheel 474 engaging with trip dog 494b, a free loose end of yarn extending off and connected to the body of bobbin B will be present at the lower end of the bobbin. As illustrated in FIG. 31 the closing of down-jet 504 occurs after approximately 280° of revolution of shaft 60.

(f) *Operation of tip-jet 512*

In the course of the end-finding cycle it is of assistance to afford means for preventing the coils of wraps of yarn at the upper end from sloughing off the body of the bobbin. For this purpose tip-jet 512 directs a fixed stream of air somewhat downwardly against the upper wraps of yarn on the bobbin. The air from tip-jet 512 is actuated after shaft 60 has revolved about 182° and remains on through virtually all of the end-finding cycle, this jet being turned off just prior to positioning of bobbin B' in its active unwinding position as shown in FIG. 31.

(g) *Actuating the suction system to aperture 576*

With continuing reference to FIG. 31, after generally 290° of rotation of shaft 60 camming surface 602 is brought into contact with follower 596. At this time shutter 592 is retracted from its position covering opening 590. Suction is thereby induced to aperture 576 preliminary to the reception of the leading end of bobbin B' therein. Shutter 592 is closed as follower 596 is moved upwardly by cam surface 604. This motion occurs within the final 10° of rotation of shaft 60, the closing of the suction being desirable only after tube 155 has seized the new yarn end.

(h) *Operating up-jet 528 and, if desired auxiliary up-jet 520*

It will be seen from the chart of FIG. 31 that by the time shaft 60 has rotated generally 290° air motor 200 will be rotating and down-jet 504, tip-jet 512, and suction aperture 576 will all be operating in the manner just described. At this time trip dog 494b rotates valve 446 to turn down-jet 504 off. At the same time star wheel 472 is rotated into engagement with trip dog 516a to actuate valve 444 into its "on" position. In consequence thereof a fixed stream of air is directed from up-jet 528 longitudinally and upwardly against one side of bobbin B'. It will be recalled that bobbin B', at this time, has a loose, trailing end outwardly on its body which resulting from the action of down-jet 504 and the subsequent cutting operation of the cutter wheels.

To consider, now, the action of the air from up-jet 528 and its effect on this trailing end, it is to be appreciated that the trailing yarn will run back until it blends into a yarn wrap, which is one of many such wraps comprising the bobbin yarn mass. The point where the trailing end blends back into a wrap at the yarn mass will be subjected to intermittent or pulsating blast of air. This effect is achieved by virtue of the air from up-jet being fixed and by the fact that the contact point of the trailing yarn end with its wrap on the yarn mass is presented to the air stream only intermittently. Thus, upon rotation of bobbin B' the yarn end contact point on the bobbin is alternately rotated into the fixed stream and then rotated away therefrom. As a result more and more coils or wraps of yarn are freed from the yarn mass on the body of the bobbin to extend the length of the free yarn end. This end is blown upwardly out of tube 284 and, under the influence of the air from up-jet 528, is blown into bonnet 570. At this point the air stream and the yarn end are deflected toward opening 574 at the rear of the bonnet and flow outward therefrom. At this point the free yarn end is received in receptacle 578 under the influence of suction through aperture 576. In timed sequence therewith suction nozzle swings forwardly to convey this free yarn end to the uniting means in the manner fully described in the previously cited United States patent.

Auxiliary up-jet 520 has already been described as operable in conjunction with up-jet 528. This auxiliary up-jet is positioned to blow air upwardly along the side of bobbin B', the air stream coinciding with the path of air from up-jet 528. In this manner, the yarn end from bobbin B', which is in the course of upward movement under the action of air from up-jet 528 is assisted along its course by the auxiliary source of air. As has been previously stated, such auxiliary impelling may be of advantage in the finer yarn counts, particularly with longer length balloon restraining tubes or yarns, having a tendency to cling to the adjoining wraps on the bobbin. It will also be appreciated that while but one auxiliary up-jet has been described in connection with the instant invention, additional auxiliary up-jets may be disposed in the path of upward travel of the yarn end in order to facilitate its delivery into aperture 578.

(i) *Arranging the air valves after the end-finding cycle and prior to unwinding of bobbin B'*

By the time shaft 60 has rotated 280° valve 446 which controls down-jet 504 will have been indexed to its "off position" by trip dog 494b. Valve 448 will have been turned off by rotation from trip dog 508b to shut off tipjet 512.

As a further step in the final portion of its rotation shaft 60 will have carried star wheel 258 of exhaust valve 254 into contact with trip dog 255. It is to be noted, at this point, that valve 442 is open to furnish a continuous supply of air to air motor 200. When star wheel 258 strikes trip dog 255 exhaust valve 254 is closed abruptly thus sealing the column of air between it and the originating air source. This serves effectively to brake the rotation of arbor 220 and set the bobbin in a stationary position for unwinding. Of course, since the valve block is fully charged with pressurized air inflatable arbor 220 will remain expanded and gripping the bobbin.

As a final step and at the end of its full 360° cycle shaft 60 rotates star wheel 472 of valve 444 into contact with trip dog 516b to close the air supply to up-jet 528 and auxiliary up-jet 520.

When shaft 60 attains one full revolution as has now been described it will have returned arbor 220 and the other instrumentalities which it supports to the active unwinding position as illustrated in FIGS. 1, 3 and 4. The fresh active bobbin B' is now ready to supply yarn to the take-up means. In the event that there is a failure in the uniting cycle on the first full revolution of shaft 60 the instrumentalities just described come into a play for a second attempt to unite yarn ends. In this circumstance the full supply bobbin would be ejected in the manner described in connection with core C. The construction and operation of the mechanisms for initiating recycling of the shaft 60 are fully disclosed in the aforecited United States patent and patent application.

*(j) Recocking the centering mechanism and readying the magazine to deliver a new bobbin*

In the course of the final 180° of travel of shaft 60 elements are brought into action for recocking the centering mechanism so that it may be ready to guide a fresh bobbin on arbor 220. Further, a reserve bobbin B is advanced in magazine 80 to an upstanding position in chamber 94 and with its butt end resting on shelf 328. It will be obvious that these two steps are somewhat ancillary to the main end-finding cycle described herein. Therefore, they may be carried out at any convenient time after shaft 60 has advanced beyond its loading position at 180° of revolution and prior to the further loading of a fresh bobbin on inflatable arbor 220 in the next succeeding cycle. In the illustrated embodiment the segments 397, 398 and 399 are drawn closed, i.e., the centering mechanism is recocked, in the final quadrant of travel of shaft 60 (see FIG. 4). This results from the fact that roller 430, which operates arm 366 to close the segments 397, 398 and 399, trails arbor 220 by some 120° as shaft 60 rotates in the manner previously described. In recocking the segments roller 430 initially bears against arm 366 and, with continued rotation of shaft 60, pushes the arm 366 clockwise until it is locked by shoulder 426 as earlier related. Roller 430 is then free to ride unimpeded off the end of operating arm 366.

In the operation of the illustrated embodiment of the present invention magazine 80 is operated in response to contact with actuating means supported from shaft 60 in the following manner. Preparatory to advancing a reserve bobbin B into the magazine chamber 94 the pusher bar 110 is operated to advance all of the bobbins toward the chamber. This movement is initiated as cam roller 316 is carried into contact with anvil 136 of magazine 80. Cam roller 316 may be arranged to engage and operate anvil 136 at any time prior to advancing a fresh reserve bobbin B into magazine chamber 94. Here, for convenience, such action is carried out after shaft 60 has rotated arbor 220 about 90° from its active unwinding position. The movement of cam roller 316 causes anvil 136 to rock counterclockwise (see FIG. 8) on stud 133, thereby actuating arm 119 through rod 128 to shift pusher bar rearwardly in the magazine 80. As roller 316 passes anvil 136 and is released from contact therewith, pusher bar 110 urges the reserve bobbins forward in the magazine. However, the forwardmost bobbin is temporarily restrained from entering chamber 94 as it abuts against stop 144, it being presumed that a reserve bobbin will already be located in the chamber 94 from the actions of the preceding cycle.

The means for disposing a bobbin in said chamber 94 is actuated during the last half of the rotational cycle of shaft 80, it being observed from FIG. 4 that cam member 318 is positioned on the order of 30° behind or trailing arbor 220 as the shaft is turned counterclockwise. Thus, at the time member 318 cams the follower 152 rearwardly chamber 94 will be empty, the reserve bobbin therefrom having been placed on arbor 220. It will serve to note here also that prior to engagement of member 318 with follower 152, arm 119 of the magazine will have operated to shift pusher bar 110 behind reserve bobbins B' in the magazine to bias them forwardly toward chamber 94. Hence, upon rotation of cam member 318 into contact with follower 152 the follower yields rearwardly (FIG. 7) causing shaft 148, to which it is connected, to rock clockwise to the position illustrated by dotted lines in FIG. 7. In consequence thereof, segment 146 is rocked. As previously related, the butt end of the reserve bobbin being restrained against stop 144 is aligned above segment 146. Thus, upon rocking of segment 146 the reserve bobbin is lifted upward bodily to a level slightly above the top of stop 144. Pusher bar thereupon shifts the bobbin laterally into chamber 94, the bobbin coming to rest standing uprightly on shelf 328.

Since certain changes may be made in the above apparatus without departing from the scope of the invention herein involved, it is intended that all matter contained in the above description or contained in the accompanying drawing shall be interpreted as illustrative only, and not in a limiting sense.

What is claimed is:

1. In a reserve bobbin magazine for a winding machine of the type including a movable bobbin carrier, an elongated channel for containing a plurality of reserve bobbins in parallel relationship, a chamber positioned at the forward end of said channel, pushing means for urging said bobbins toward said chamber, stop means for normally arresting the entry of said bobbins into the chamber, means for admitting said reserve bobbins one-by-one into said chamber, a shelf positioned adjacent the bottom of said chamber and adapted to support a bobbin thereon, means operable in response to movement of said bobbin carrier to move said shelf and release said bobbin from said chamber for delivery to said carrier, and spring means for repositioning said shelf adjacent said chamber bottom after release of said bobbin.

2. Apparatus as set forth in claim 1 wherein said stop means includes a projecting tab, and a rockable segment arranged to release said reserve bobbins one-by-one from said stop means.

3. Apparatus as set forth in claim 1 wherein said pushing means includes a rotatable pusher bar, means operable in response to movement of said bobbin carrier to shift said pusher bar in alternate rearward and forward strokes relative to said channel, means for rotatably mounting said pusher bar whereby said bar is rotated away from said channel on said rearward stroke, and means for rotating said bar into said channel on said forward stroke for contact with a reserve bobbin in said magazine to thereby urge said bobbin toward said chamber.

(References on following page)

References Cited by the Examiner

UNITED STATES PATENTS

| | | | |
|---|---|---|---|
| 1,938,753 | 12/33 | Niederstadt | 221—232 |
| 2,255,538 | 9/41 | Cameron | 221—225 |
| 2,353,394 | 7/44 | Farmer | 221—232 |
| 2,532,775 | 12/50 | Leonard | 221—225 |
| 2,784,872 | 3/57 | Lux | 221—207 |
| 2,936,130 | 5/60 | Reiners et al. | 242—35.6 |
| 3,016,166 | 1/62 | Furst | 221—200 |
| 3,059,866 | 10/62 | Reiners | 242—35.6 |

RAPHAEL M. LUPO, *Primary Examiner.*

RUSSELL C. MADER, LOUIS J. DEMBO, *Examiners.*